(12) United States Patent
Ito

(10) Patent No.: US 10,578,844 B2
(45) Date of Patent: Mar. 3, 2020

(54) VARIABLE-POWER OPTICAL SYSTEM, OPTICAL DEVICE, AND METHOD FOR MANUFACTURING VARIABLE-POWER OPTICAL SYSTEM

(71) Applicant: Nikon Corporation, Minato-ku, Tokyo (JP)

(72) Inventor: Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/418,775

(22) Filed: Jan. 29, 2017

(65) Prior Publication Data

US 2017/0184829 A1 Jun. 29, 2017

Related U.S. Application Data

(63) Continuation of application No. PCT/JP2015/071582, filed on Jul. 30, 2015.

(30) Foreign Application Priority Data

Jul. 30, 2014 (JP) .................................. 2014-154843
Jul. 30, 2014 (JP) .................................. 2014-154844

(51) Int. Cl.
*G02B 15/14* (2006.01)
*G02B 15/20* (2006.01)
(Continued)

(52) U.S. Cl.
CPC .............. *G02B 15/20* (2013.01); *G02B 15/14* (2013.01); *G02B 15/167* (2013.01);
(Continued)

(58) Field of Classification Search
CPC .............. G02B 27/646; G02B 27/0025; G02B 13/004; G02B 15/20; G02B 13/009;
(Continued)

(56) References Cited

U.S. PATENT DOCUMENTS 8,625,202 B2 * 1/2014 Yoshinaga ........... G02B 15/173
359/676
2005/0041305 A1 2/2005 Ishii
(Continued)

FOREIGN PATENT DOCUMENTS

EP 2 237 095 A1 10/2010
JP 61-236516 A 10/1986
(Continued)

OTHER PUBLICATIONS

Office Action dated May 22, 2018, in Japanese Patent Application No. 2016-538417.
(Continued)

*Primary Examiner* — Robert E. Tallman

(74) *Attorney, Agent, or Firm* — SGPatents PLLC

(57) ABSTRACT

Comprising a first lens group G1 having positive refractive power, disposed at the most object side, and an image side lens group disposed at a side closer to an image than the first lens group G1, upon zooming, at least a distance between the first lens group G1 and the image side lens group being varied, the image side lens group comprising a vibration reduction lens group GVR which is moved so as to have a component in a direction perpendicular to the optical axis and a focusing lens group GF which is moved along the optical axis upon focusing, thereby providing a variable magnification optical system which has a higher optical performance, an optical apparatus and a method for manufacturing a variable magnification optical system.

24 Claims, 15 Drawing Sheets

(51) Int. Cl.
*G02B 15/167* (2006.01)
*G02B 15/173* (2006.01)
*H04N 5/225* (2006.01)
*G02B 27/64* (2006.01)
*G02B 27/00* (2006.01)
*G02B 15/163* (2006.01)
*G02B 13/00* (2006.01)
*G02B 5/00* (2006.01)
*G02B 9/34* (2006.01)
*G02B 13/18* (2006.01)
*G02B 15/16* (2006.01)

(52) U.S. Cl.
CPC ........... *G02B 15/173* (2013.01); *H04N 5/225* (2013.01); *G02B 5/005* (2013.01); *G02B 9/34* (2013.01); *G02B 13/002* (2013.01); *G02B 13/004* (2013.01); *G02B 13/009* (2013.01); *G02B 13/18* (2013.01); *G02B 15/16* (2013.01); *G02B 15/163* (2013.01); *G02B 27/0025* (2013.01); *G02B 27/646* (2013.01)

(58) Field of Classification Search
CPC .......... G02B 9/34; G02B 13/18; G02B 15/14; G02B 15/163; G02B 5/005; G02B 13/002
USPC ................ 359/557, 683–688, 715–717, 740, 359/771–776
See application file for complete search history.

(56) References Cited

U.S. PATENT DOCUMENTS

| | | | |
|---|---|---|---|
| 2005/0168833 | A1 | 8/2005 | Horiuchi |
| 2007/0115562 | A1 | 5/2007 | Horiuchi |
| 2009/0086321 | A1 | 4/2009 | Mizuguchi et al. |
| 2010/0284092 | A1* | 11/2010 | Hayakawa ........... G02B 15/173 359/683 |
| 2013/0120640 | A1 | 5/2013 | Taki |

FOREIGN PATENT DOCUMENTS

| | | |
|---|---|---|
| JP | 2004-341060 A | 12/2004 |
| JP | 2005-215518 A | 8/2005 |
| JP | 2009-156893 A | 7/2009 |
| JP | 2013-105131 A | 5/2013 |
| JP | 2014-035480 A | 2/2014 |
| JP | 2014-085488 A | 5/2014 |

OTHER PUBLICATIONS

International Preliminary Report on Patentability from International Patent Application No. PCT/JP2015/071582, dated Feb. 9, 2017.
International Search Report from International Patent Application No. PCT/JP2015/071582, dated Oct. 27, 2015.
Office Action dated Mar. 14, 2019, in European Patent Application No. 15826871.4.

* cited by examiner

VARIABLE-POWER OPTICAL SYSTEM, OPTICAL DEVICE, AND METHOD FOR MANUFACTURING VARIABLE-POWER OPTICAL SYSTEM

TECHNICAL FIELD

The present invention relates to a variable magnification optical system, an optical device, and a method for producing the variable magnification optical system.

BACKGROUND ART

Conventionally, there have been proposed variable magnification optical systems which are suitable for a photographing camera, an electronic still camera, a video camera or the like. See, for example, Japanese patent application Laid-Open Gazette No. 2013-105131.

PRIOR ART DOCUMENT

Patent Document

Patent Document 1: Japanese patent application Laid-Open Gazette No. 2013-105131

SUMMARY OF THE INVENTION

Problem to be Solved by the Invention

However, in the conventional variable magnification optical systems as described above, there was a problem that the optical performance was insufficient.

The present invention is made in view of the above-mentioned problem. It is an object of the present invention to provide a variable magnification optical system with higher optical performance, an optical apparatus, and a method for manufacturing the variable magnification optical system.

Means for Solving the Problem

In order to solve the above-mentioned object, according to a first aspect of the present invention, there is provided a variable magnification optical system comprising:

a first lens group having positive refractive power, disposed at the most object side, and an image side lens group disposed at a side closer to an image than the first lens group, upon zooming, at least a distance between the first lens group and the image side lens group being varied, the image side lens group comprising a vibration reduction lens group which is moved so as to have a component in a direction perpendicular to the optical axis and a focusing lens group which is moved along the optical axis upon focusing.

According to a second aspect of the present invention, there is provided a variable magnification optical system comprising:

a first lens group having positive refractive power, disposed at the most object side, and an image side lens group disposed at a side closer to an image than the first lens group, upon zooming, at least a distance between the first lens group and the image side lens group being varied, the image side lens group comprising a focusing lens group which is moved along the optical axis upon focusing, the focusing lens group comprising, in order from an object side, a first focusing group and a second focusing group, and the following conditional expression is satisfied:

$$0.10 < |fp|/f4 < 0.45$$

where fp denotes a focal length of the second focusing group; and f4 denotes a focal length of the image side lens group.

Further, in the first and the second aspects of the present invention, upon zooming, the first lens group is preferably fixed for the position.

Further, in the first and the second aspects of the present invention, it is preferable that the focusing lens group comprises a first focusing group having negative refractive power and a second focusing group having positive refractive power, and that, upon focusing, a distance between the first focusing group and the second focusing group is varied.

Further, in the first and the second aspects of the present invention, it is preferable that the focusing lens group comprises a first focusing group and a second focusing group, and that, upon focusing from an infinitely distance object to a close distance object, the first focusing group is moved along the optical axis toward the image side and the second focusing group is moved along the optical axis toward the object side.

Further, in the first and the second aspects of the present invention, it is preferable that the focusing lens group comprises a first focusing group having negative refractive power and a second focusing group, and that the following conditional expression is satisfied:

$$0.20 < (-fn)/f4 < 0.60$$

where fn denotes a focal length of the first focusing group; and f4 denotes a focal length of the image side lens group.

Further, in the second aspect of the present invention, it is preferable that the image side lens group comprises a vibration reduction lens group which is moved so as to have a component in a direction perpendicular to the optical axis.

Further, in the first and the second aspects of the present invention, it is preferable that the image side lens group comprises a vibration reduction lens group which is moved so as to have a component in a direction perpendicular to the optical axis, and that the following conditional expression is satisfied:

$$0.10 < |fvr|/f4 < 0.80$$

where fvr denotes a focal length of the vibration reduction lens group, and f4 denotes a focal length of the image side lens group.

Further, in the first and the second aspects of the present invention, it is preferable that the focusing lens group comprises a first focusing group and a second focusing group, and that the following conditional expression is satisfied:

$$0.12 < D/D4 < 0.40$$

where D denotes a distance between the first focusing group and the second focusing group upon focusing on an infinitely distant object, and D4 denotes a length on the optical axis of the image side lens group.

Further, in the first and the second aspects of the present invention, it is preferable that the image side lens group is a lens group disposed at the most image side, and that, upon zooming, a distance between the lenses included in the image side lens group is not varied.

Further, the first and the second aspects of the present invention preferably comprise, in order from an object side, the first lens group, a second lens group having negative refractive power, a third lens group having positive refractive power, and the image side lens group.

Further, a third aspect of the present invention provides an optical apparatus equipped with the variable magnification optical system according to the first aspect of the present invention.

Further, a fourth aspect of the present invention provides an optical apparatus equipped with the variable magnification optical system according to the second aspect of the present invention.

Further, a fifth aspect of the present invention provides a method for manufacturing a variable magnification optical system comprising, in order from an object side, a first lens group having positive refractive power, a second lens group having negative refractive power, a third lens group having positive refractive power and a fourth lens group having positive refractive power, the method comprising:

configuring the lens groups such that, upon zooming, a distance between adjacent lens groups is varied, constructing the fourth lens group so as to comprise a vibration reduction lens group which is moved so as to have a component in a direction perpendicular to the optical axis and a focusing lens group which is moved along the optical axis upon focusing.

Further, a sixth aspect of the present invention provides a method for manufacturing a variable magnification optical system comprising, in order from an object side, a first lens group having positive refractive power, a second lens group having negative refractive power, a third lens group having positive refractive power and a fourth lens group having positive refractive power, the method comprising:

configuring the lens groups such that, upon zooming, a distance between adjacent lens groups is varied, constructing the fourth lens group so as to comprise a focusing lens group which is moved along the optical axis upon focusing, constructing the focusing lens group so as to comprise, in order from an object side, a first focusing group having negative refractive power and a second focusing group having positive refractive power, and constructing the variable magnification optical system so as to satisfy the following conditional expression:

$$0.10 < fp/f4 < 0.45$$

where fp denotes a focal length of the second focusing group; and f4 denotes a focal length of the fourth lens group.

Effect of the Invention

According to the first, the third and the fifth aspects of the present invention, a variable magnification optical system with higher optical performance while having a vibration reducing function, an optical apparatus, and a method for manufacturing the variable magnification optical system can be provided.

According to the second, the fourth and the sixth aspects of the present invention, a variable magnification optical system with higher optical performance, an optical apparatus, and a method for manufacturing the variable magnification optical system can be provided.

EMBODIMENTS FOR CARRYING OUT THE INVENTION

Figure 1:
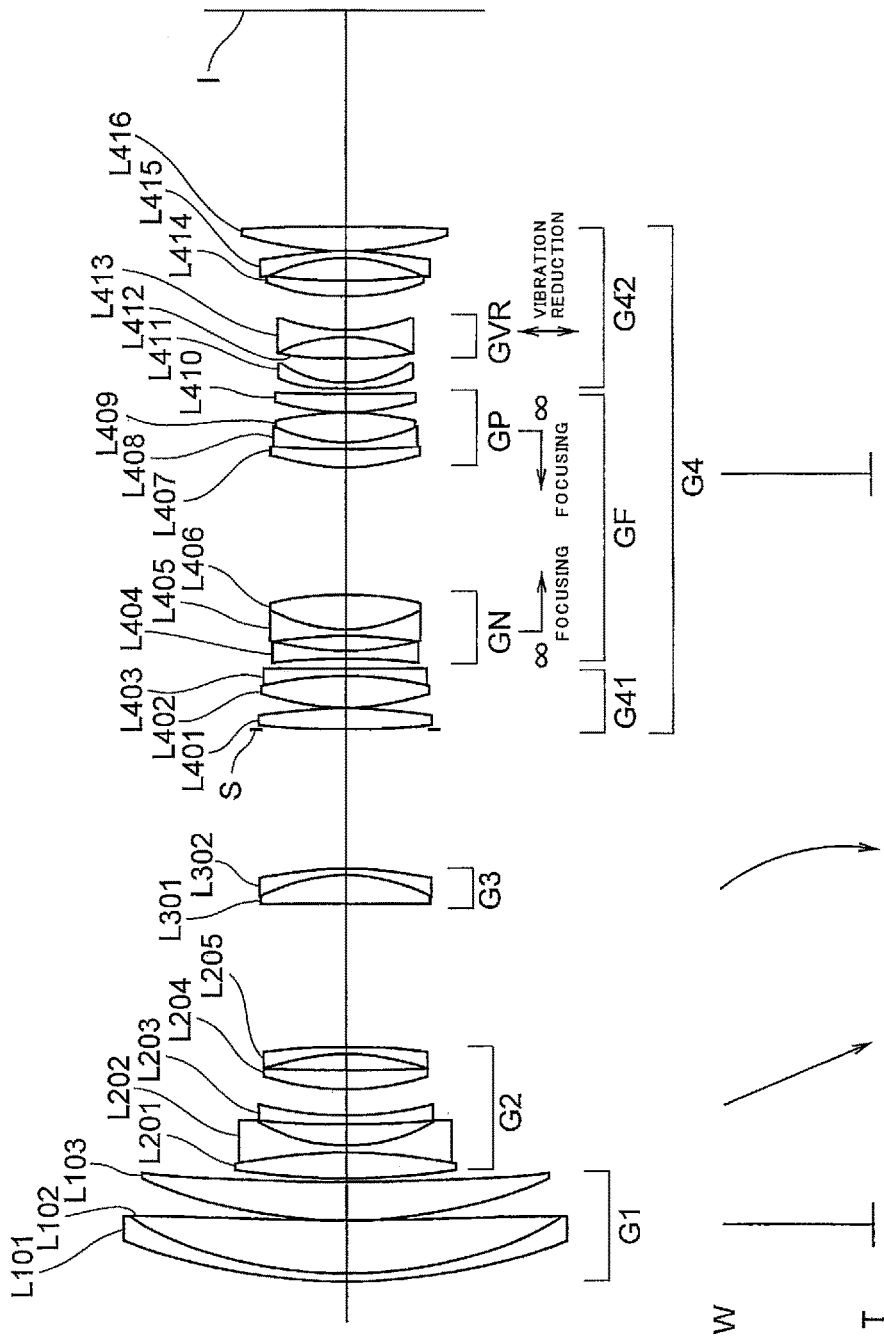
FIG. 1 shows a sectional view of a variable magnification optical system in a wide-angle end state according to a first Example common to a first and a second Embodiment of the present application.

Now, a variable magnification optical system according to a first Embodiment of the present application, an optical apparatus, and a method for producing the variable magnification optical system will be described below.

A variable magnification optical system according to a first Embodiment of the present application is characterized in that the system comprises, in order from an object side, a first lens group having positive refractive power, a second lens group having negative refractive power, a third lens group having positive refractive power and a fourth lens group having positive refractive power, and upon zooming, a distance between adjacent lens groups is varied, and the first lens group is fixed for the position, and the fourth lens group comprises a vibration reduction lens group which is moved so as to have a component in a direction perpendicular to the optical axis and a focusing lens group which is moved along the optical axis upon focusing.

As described above, the variable magnification optical system according to the first Embodiment of the present application comprises, in order from an object side, a first lens group having positive refractive power, a second lens group having negative refractive power, a third lens group having positive refractive power and a fourth lens group having positive refractive power. Upon zooming, the distance between the adjacent lens groups is varied, and the first lens group is fixed for the position. With the configuration, it is possible to achieve ensuring a desired variable magnification ratio, simplifying a variable magnification mechanism, downsizing a lens barrel and reducing performance degradation due to a manufacturing error.

Also, as described above, the variable magnification optical system according to the first Embodiment of the present application is constructed so that the fourth lens group comprises the focusing lens group which is moved along the optical axis upon focusing. With the configuration, it is possible to achieve reducing a change in the optical performance upon focusing and downsizing a focusing unit.

Also, as described above, the variable magnification optical system according to the first Embodiment of the present application is constructed so that the fourth lens group comprises a vibration reduction lens group which is moved so as to have a component in a direction perpendicular to the optical axis. With the configuration, it is possible to achieve correcting image blur caused by camera shake or vibration, i.e., implementing vibration reduction, in particular, reducing a change in the optical performance upon the vibration reduction, and downsizing a vibration reduction unit.

With the above described configuration, it is possible to realize a variable magnification optical system which has higher optical performance while exhibiting the vibration reduction function.

It is also desirable that the variable magnification optical system according to the first embodiment of the present application satisfies the following conditional expression (1-1):

$$0.10 < |fvr|/f4 < 0.80 \tag{1-1}$$

where fvr denotes a focal length of the vibration reduction lens group, and f4 denotes a focal length of the fourth lens group.

The conditional expression (1-1) defines a range of the focal length of the vibration reduction lens group relative to the focal length of the fourth lens group. The variable magnification optical system according to the first Embodiment of the present application can achieve good performance for vibration reduction by satisfying the following conditional expression (1-1).

When the value of $|fvr|/f4$ is equal to or falls below the lower limit of the conditional expression (1-1) for the variable magnification optical system according to the first Embodiment of the present application, it is not preferred because the vibration reduction lens group becomes larger in the refractive power, and as a result, it is difficult to make a correction of image plane variation upon vibration reduction and of eccentric coma. Note that, in order to further ensure the advantageous effect of the present application, the lower limit value of the conditional expression (1-1) is more preferably set to 0.20.

When the value of $|fvr|/f4$ is equal to or exceeds the upper limit of the conditional expression (1-1) for the variable magnification optical system according to the first Embodiment of the present application, it is not preferred because the vibration reduction lens group becomes smaller in the refractive power, and as a result, it is difficult to downsize the vibration reduction unit. Note that, in order to further ensure the advantageous effect of the present application, the upper limit value of the conditional expression (1-1) is more preferably set to 0.60.

Also, the variable magnification optical system according to the first Embodiment of the present application is preferably constructed so that the focusing lens group comprises, in order from the object side, a first focusing group having negative refractive power and a second focusing group having positive refractive power, and upon focusing from an infinitely distant object to a close distant object, the first focusing group is moved toward the image side along the optical axis, and the second focusing group is moved toward the object side along the optical axis. With the configuration, it is possible to achieve reducing a change in the optical performance due to the focusing.

It is also desirable that the variable magnification optical system according to the first Embodiment of the present application satisfies the following conditional expression (1-2):

$$0.10<(-fn)/f4<0.60 \quad (1-2)$$

where fn denotes a focal length of the first focusing group; and f4 denotes a focal length of the fourth lens group.

The conditional expression (1-2) defines a range of the focal length of the first focusing group relative to the focal length of the fourth lens group. The variable magnification optical system according to the first Embodiment of the present application can achieve good optical performance upon focusing by satisfying the conditional expression (1-2).

When the value of (−fn)/f4 is equal to or falls below the lower limit of the conditional expression (1-2) for the variable magnification optical system according to the first Embodiment of the present application, it is not preferred because the first focusing group becomes larger in the refractive power, and as a result, it is difficult to make a correction of spherical aberration and curvature of field upon focusing. Note that, in order to further ensure the advantageous effect of the present application, the lower limit value of the conditional expression (1-2) is more preferably set to 0.22.

On the other hand, when the value of (−fn)/f4 is equal to or exceeds the upper limit of the conditional expression (1-2) for the variable magnification optical system according to the first Embodiment of the present application, it is not preferred because the fourth lens group becomes larger in the refractive power, and as a result, it is difficult to make a correction of spherical aberration in the telephoto end state. Note that, in order to further ensure the advantageous effect of the present application, the upper limit value of the conditional expression (1-2) is more preferably set to 0.45.

It is also desirable that the variable magnification optical system according to the first Embodiment of the present application satisfies the following conditional expression (1-3):

$$0.10<fp/f4<0.50 \quad (1-3)$$

where fp denotes a focal length of the second focusing group; and f4 denotes a focal length of the fourth lens group.

The conditional expression (1-3) defines a range of the focal length of the second focusing group relative to the focal length of the fourth lens group. The variable magnification optical system according to the first Embodiment of the present application can achieve good optical performance upon focusing by satisfying the conditional expression (1-3).

When the value of fp/f4 is equal to or falls below the lower limit of the conditional expression (1-3) for the variable magnification optical system according to the first Embodiment of the present application, it is not preferred because the second focusing group becomes larger in the refractive power, and as a result, a variation in aberration upon focusing becomes larger. Note that, in order to further ensure the advantageous effect of the present application, the lower limit value of the conditional expression (1-3) is more preferably set to 0.15.

On the other hand, when the value of fp/f4 is equal to or exceeds the upper limit of the conditional expression (1-3) for the variable magnification optical system according to the first Embodiment of the present application, it is not preferred because the fourth lens group becomes larger in the refractive power, and as a result, it is difficult to make a correction of spherical aberration in the telephoto end state. Note that, in order to further ensure the advantageous effect of the present application, the upper limit value of the conditional expression (1-3) is more preferably set to 0.40.

It is also desirable that the variable magnification optical system according to the first Embodiment of the present application satisfies the following conditional expression (1-4):

$$0.12<D/D4<0.40 \quad (1-4)$$

where D denotes a distance between the first focusing group and the second focusing group upon focusing on an infinitely distant object, and D4 denotes a length on the optical axis of the fourth lens group.

The conditional expression (1-4) defines an air distance between the first focusing group and the second focusing group relative to a thickness of, that is, a length on the optical axis of the fourth lens group. The variable magnification optical system according to the first Embodiment of the present application can achieve good optical performance upon focusing by satisfying the conditional expression (1-4).

When the value of D/D4 is equal to or falls below the lower limit of the conditional expression (1-4) for the variable magnification optical system according to the first Embodiment of the present application, a sufficient space cannot be disadvantageously ensured for the movement of the first focusing group and the second focusing group upon focusing. Owing to this, the refractive power of the first focusing group and the second focusing group has to be made larger, and as a result, it is difficult to make a correction of spherical aberration and curvature of field upon focusing, which is not preferred. Note that, in order to further ensure the advantageous effect of the present application, the lower limit value of the conditional expression (1-4) is more preferably set to 0.15.

On the other hand, when the value of D/D4 is equal to or exceeds the upper limit of the conditional expression (1-4) for the variable magnification optical system according to the first Embodiment of the present application, a sufficient space for the disposition of the vibration reduction lens group cannot be disadvantageously ensured within the fourth lens group. When the refractive power of the first lens group and the second lens group is made greater in order to ensure the space for the disposition of the vibration reduction lens group within the fourth lens group, however, it is difficult to make a correction of the spherical aberration in the telephoto end state, which is not preferred. Note that, in order to further ensure the advantageous effect of the present application, the upper limit value of the conditional expression (1-4) is more preferably set to 0.35.

In the variable magnification optical system according to the first Embodiment of the present application, it is desired that the vibration reduction lens group is disposed at the side closer to the image than the focusing lens group. With such configuration, it is possible to make the diameter of the vibration reduction lens group smaller and thus achieve downsizing the lens barrel.

An optical apparatus of the present application is characterized by comprising a variable magnification optical system of the above-mentioned configuration according to the first Embodiment. Accordingly, an optical apparatus can be realized which is provided with a higher optical performance while fulfilling the vibration reduction function.

A method for manufacturing a variable magnification optical system according to the first Embodiment of the present application is characterized in that the method is a method for manufacturing a variable magnification optical system comprising, in order from an object side, a first lens group having positive refractive power, a second lens group having negative refractive power, a third lens group having positive refractive power, and a fourth lens group having positive refractive power, and the method comprises configuring the lens groups such that, upon zooming, a distance between adjacent lens groups is varied and the position of the first lens group is fixed, and constructing the fourth lens group so as to comprise a vibration reduction lens group which is moved so as to contain a component in a direction perpendicular to the optical axis and a focusing lens group which is moved along the optical axis upon focusing. With the method, it is possible to manufacture a variable magnification optical system which has higher optical performance while exhibiting the vibration reduction function.

Now, a variable magnification optical system according to a second Embodiment of the present application, an optical apparatus, and a method for producing the variable magnification optical system will be described below.

The variable magnification optical system according to the second Embodiment of the present application is characterized in that the system comprises, in order from an object side, a first lens group having positive refractive power, a second lens group having negative refractive power, a third lens group having positive refractive power and a fourth lens group having positive refractive power, and upon zooming, a distance between adjacent lens groups is varied, and the first lens group is fixed for the position, and the fourth lens group comprises a focusing lens group which is moved along the optical axis upon focusing, the focusing lens group comprises, in order from object side, a first focusing group having negative refractive power and a second focusing group having positive refractive power, and the system satisfies the following conditional expression:

$$0.10 < fp/f4 < 0.45 \quad (2\text{-}1)$$

where fp denotes a focal length of the second focusing group; and f4 denotes a focal length of the fourth lens group.

As described above, the variable magnification optical system according to the second Embodiment of the present application comprises, in order from an object side, a first lens group having positive refractive power, a second lens group having negative refractive power, a third lens group having positive refractive power and a fourth lens group having positive refractive power. Upon zooming, the distance between the adjacent lens groups is varied, and the first lens group is fixed for the position. With the configuration, it is possible to achieve ensuring a desired variable magnification ratio, simplifying a variable magnification mechanism, downsizing a lens barrel and reducing performance degradation due to a manufacturing error.

Also, as described above, the variable magnification optical system according to the second Embodiment of the present application is constructed so that the fourth lens group comprises the focusing lens group which is moved along the optical axis upon focusing. With the configuration, it is possible to achieve reducing a change in the optical performance upon focusing and downsizing a focusing unit.

Also, as described above, the variable magnification optical system according to the second Embodiment of the present application is constructed so that the focusing lens group comprises, in order from the object side, a first focusing group having negative refractive power and a second focusing having positive refractive power. With the configuration, it is possible to reduce a change in the optical performance due to the focusing.

The conditional expression (2-1) defines a range of the focal length of the second focusing group relative to the focal length of the fourth lens group. The variable magnification optical system according to the second Embodiment of the present application can achieve good optical performance upon focusing by satisfying the conditional expression (2-1).

When the value of fp/f4 is equal to or falls below the lower limit of the conditional expression (2-1) for the variable magnification optical system according to the second Embodiment of the present application, it is not preferred because the second focusing group becomes larger in the refractive power, and as a result, a variation in aberration upon focusing becomes larger. Note that, in order to further ensure the advantageous effect of the present application, the lower limit value of the conditional expression (2-1) is more preferably set to 0.15.

On the other hand, when the value of fp/f4 is equal to or exceeds the upper limit of the conditional expression (2-1) for the variable magnification optical system according to the second Embodiment of the present application, it is not preferred because the fourth lens group becomes larger in the refractive power, and as a result, it is difficult to make a correction of spherical aberration in the telephoto end state. Note that, in order to further ensure the advantageous effect of the present application, the upper limit value of the conditional expression (2-1) is more preferably set to 0.40.

With the above described configuration, it is possible to realize a variable magnification optical system which is provided with higher optical performance.

Also, the variable magnification optical system according to the second Embodiment of the present application is preferably constructed so that, upon focusing from an infinitely distant object to a close distant object, the first focusing group is moved toward the image side along the optical axis, and the second focusing group is moved toward the object side along the optical axis. With the configuration, it is possible to satisfactorily reduce a change in the optical performance due to the focusing.

It is also desirable that the variable magnification optical system according to the second Embodiment of the present application satisfies the following conditional expression (2-2):

$$0.20 < (-fn)/f4 < 0.60 \quad (2\text{-}2)$$

where fn denotes a focal length of the first focusing group; and f4 denotes a focal length of the fourth lens group.

The conditional expression (2-2) defines a range of the focal length of the first focusing group relative to the focal length of the fourth lens group. The variable magnification optical system according to the second Embodiment of the present application can achieve good optical performance upon focusing by satisfying the conditional expression (2-2).

When the value of (−fn)/f4 is equal to or falls below the lower limit of the conditional expression (2-2) for the variable magnification optical system according to the second Embodiment of the present application, it is not preferred because the first focusing group becomes larger in the refractive power, and as a result, it is difficult to make a correction of spherical aberration and curvature of field upon focusing. Note that, in order to further ensure the advantageous effect of the present application, the lower limit value of the conditional expression (2-2) is more preferably set to 0.22.

On the other hand, when the value of (−fn)/f4 is equal to or exceeds the upper limit of the conditional expression (2-2) for the variable magnification optical system according to the second Embodiment of the present application, it is not preferred because the fourth lens group becomes larger in the refractive power, and as a result, it is difficult to make a correction of spherical aberration in the telephoto end state. Note that, in order to further ensure the advantageous effect of the present application, the upper limit value of the conditional expression (2-2) is more preferably set to 0.45.

Also, the variable magnification optical system according to the second Embodiment of the present application is preferably constructed so that the fourth lens group comprises the vibration reduction lens group which is moved so as to have a component in a direction perpendicular to the optical axis. With the configuration, it is possible to achieve correcting image blur caused by camera shake or vibration, i.e., implementing vibration reduction, in particular, reducing a change in the optical performance upon the vibration reduction, and downsizing a vibration reduction unit.

It is also desirable that the variable magnification optical system according to the second Embodiment of the present application satisfies the following conditional expression (2-3):

$$0.10<|fvr|/f4<0.80 \qquad (2-3)$$

where fvr denotes a focal length of the vibration reduction lens group, and f4 denotes a focal length of the fourth lens group.

The conditional expression (2-3) defines a range of the focal length of the vibration reduction lens group relative to the focal length of the fourth lens group. The variable magnification optical system according to the second Embodiment of the present application can achieve good performance for vibration reduction by satisfying the following conditional expression (2-3).

When the value of |fvr|/f4 is equal to or falls below the lower limit of the conditional expression (2-3) for the variable magnification optical system according to the second Embodiment of the present application, it is not preferred because the vibration reduction lens group becomes larger in the refractive power, and as a result, it is difficult to make a correction of image plane variation upon vibration reduction and of eccentric coma. Note that, in order to further ensure the advantageous effect of the present application, the lower limit value of the conditional expression (2-3) is more preferably set to 0.20.

On the other hand, when the value of |fvr|/f4 is equal to or exceeds the upper limit of the conditional expression (2-3) for the variable magnification optical system according to the second Embodiment of the present application, it is not preferred because the vibration reduction lens group becomes smaller in the refractive power, and as a result, it is difficult to downsize the vibration reduction unit. Note that, in order to further ensure the advantageous effect of the present application, the upper limit value of the conditional expression (2-3) is more preferably set to 0.60.

Also, the variable magnification optical system according to the second Embodiment of the present application is preferably constructed so that the vibration reduction lens is disposed at the side closer to the image than the focusing lens group. With such configuration, it is possible to make the diameter of the vibration reduction lens group smaller and achieve downsizing the lens barrel.

It is also desirable that the variable magnification optical system according to the second Embodiment of the present application satisfies the following conditional expression (2-4):

$$0.12<D/D4<0.40 \qquad (2-4)$$

where D denotes a distance between the first focusing group and the second focusing group upon focusing on an infinitely distant object, and D4 denotes a length on the optical axis of the fourth lens group.

The conditional expression (2-4) defines an air distance between the first focusing group and the second focusing group relative to a thickness of the fourth lens group, that is, a length on the optical axis of the fourth lens group. The variable magnification optical system according to the second Embodiment of the present application can achieve good optical performance upon focusing by satisfying the conditional expression (2-4).

When the value of D/D4 is equal to or falls below the lower limit of the conditional expression (2-4) for the variable magnification optical system according to the second Embodiment of the present application, a sufficient space cannot be disadvantageously ensured for the movement of the first focusing group and the second focusing group upon focusing. Owing to this, however, the refractive power of the first focusing group and the second focusing group has to be made larger, and as a result, it is difficult to make a correction of spherical aberration and of field curvature upon focusing, which is not preferred. Note that, in order to further ensure the advantageous effect of the present application, the lower limit value of the conditional expression (2-4) is more preferably set to 0.15.

On the other hand, when the value of D/D4 is equal to or exceeds the upper limit of the conditional expression (2-4) for the variable magnification optical system according to the second Embodiment of the present application, a sufficient space for the disposition of the vibration reduction lens group cannot be disadvantageously ensured within the fourth lens group. When the refractive power of the first lens group and the second lens group is made greater in order to ensure the space for the disposition of the vibration reduction lens group within the fourth lens group, however, it is difficult to make a correction of the spherical aberration in the telephoto end state, which is not preferred. Note that, in order to further ensure the advantageous effect of the present application, the upper limit value of the conditional expression (2-4) is more preferably set to 0.35.

An optical apparatus of the present application is characterized by comprising a variable magnification optical system of the above-mentioned configuration according to the second Embodiment. As a result, it is possible to realize an optical apparatus with higher optical performance.

A method for manufacturing a variable magnification optical system according to the second Embodiment of the present application is characterized in that the method is a method for manufacturing a variable magnification optical system comprising, in order from an object side, a first lens group having positive refractive power, a second lens group having negative refractive power, a third lens group having positive refractive power, and a fourth lens group having positive refractive power, and the method comprises configuring the lens groups such that, upon zooming, a distance between adjacent lens groups is varied and the position of the first lens group is fixed, constructing the fourth lens group so as to comprise a focusing lens group which is moved along the optical axis upon focusing, constructing the focusing lens group so as to comprise, in order from the object side, a first focusing group having negative refractive power and a second focusing group having positive refractive power, and constructing the variable magnification optical system so as to satisfy the following conditional expression (2-1). With the method, it is possible to manufacture a variable magnification optical system with higher optical performance.

$$0.10 < fp/f4 < 0.45 \quad (2\text{-}1)$$

where fp denotes a focal length of the second focusing group; and f4 denotes a focal length of the fourth lens group.

Now, variable magnification optical systems according to numerical Examples of the first and the second Embodiments of the present application will be described below with reference to the accompanying drawings. In this connection, a first to third Examples are common to the first and the second Embodiments.

First Example

Figure 5:
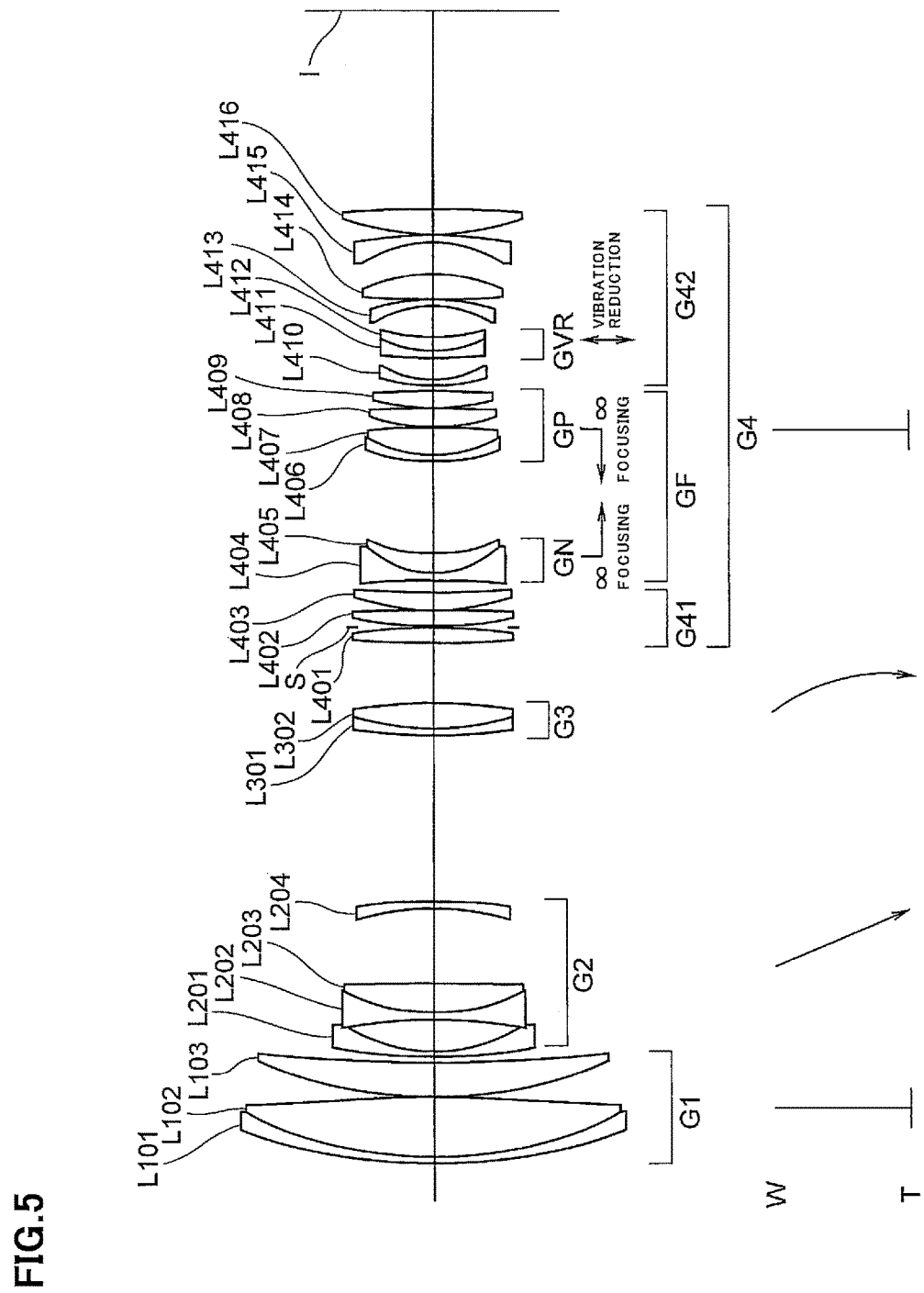
FIG. 5 shows a sectional view of a variable magnification optical system in a wide-angle end state according to a second Example common to the first and the second Embodiments of the present application.
Figure 9:
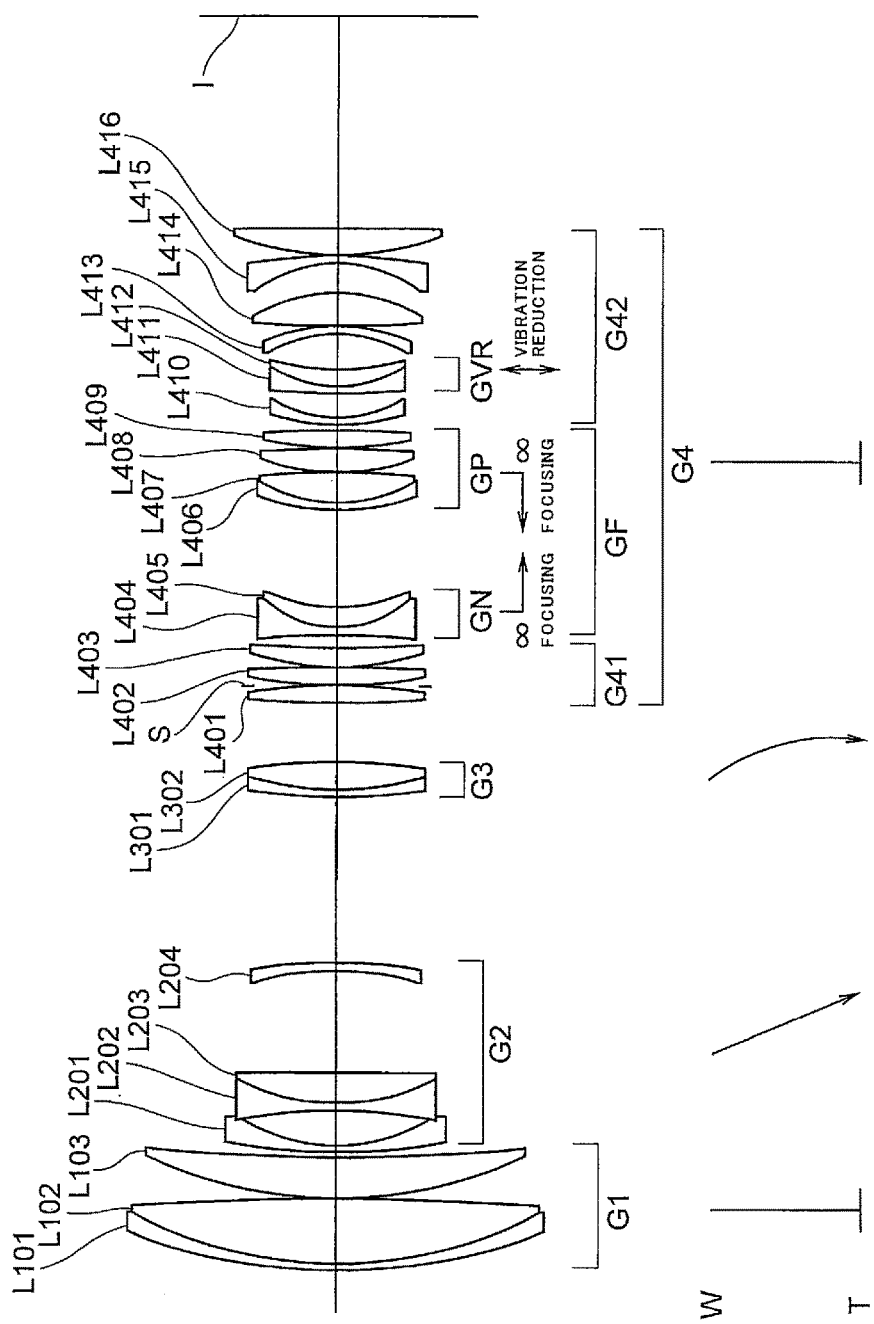
FIG. 9 shows a sectional view of a variable magnification optical system in a wide-angle end state according to a third Example common to the first and the second Embodiments of the present application.

FIG. 1 shows a sectional view of a variable magnification optical system in a wide-angle end state according to a first Example common to the first and the second Embodiments of the present application. In FIG. 1, and FIGS. 5 and 9, the arrows refer to the movement locus of lens groups upon zooming from a wide-angle end state (W) to a telephoto end state (T).

The variable magnification optical system according to the present Example is composed of, in order from the object side, a first lens group G1 having positive refractive power, a second lens group G2 having negative refractive power, a third lens group G3 having positive refractive power, and a fourth lens group G4 having positive refractive power.

The first lens group G1 consists of, in order from the object side, a cemented lens constructed by a negative meniscus lens L101 having a convex surface facing the object side cemented with a positive meniscus lens L102 having a convex surface facing the object side, and a positive meniscus lens L103 having a convex surface facing the object side.

The second lens group G2 consists of, in order from the object side, a cemented lens constructed by a double convex positive lens L201 cemented with a double concave negative lens L202, a negative meniscus lens L203 lens having a convex surface facing the object side, a positive meniscus lens L204 having a convex surface facing the object side, and a negative meniscus lens L205 having a convex surface facing the image side.

The third lens group G3 consists of, in order from the object side, a cemented lens constructed by a double convex positive lens L301 cemented with a negative meniscus lens L302 having a convex surface facing the image side.

The fourth lens group G4 consists of, in order from the object side, a first fixed lens group G41 having positive refractive power, a focusing lens group GF having positive refractive power, and a second fixed lens group G42 having negative refractive power.

The first fixed lens group G41 consists of, in order from the object side, an aperture stop S, a double convex positive lens L401, and a cemented lens constructed by a double convex positive lens L402 cemented with a double concave negative lens L403.

The focusing lens group GF consists of, in order from the object side, a first focusing group GN having negative refractive power and a second focusing group GP having positive refractive power.

The first focusing group GN consists of, in order from the object side, a double concave negative lens L404, and a cemented lens constructed by a double concave negative lens L405 cemented with a double convex positive lens L406.

The second focusing group GP consists of, in order from the object side, a positive meniscus lens L407 having a convex surface facing the object side, a cemented lens constructed by a negative meniscus lens L408 having a convex surface facing the object side cemented with and a double convex positive lens L409, and a positive meniscus lens L410 having a convex surface facing the object side.

The second fixed lens group G42 consists of, in order from the object side, a negative meniscus lens L411 having a convex surface facing the object side, a vibration reduction lens group GVR having negative refractive power, a positive meniscus lens L414 having a convex surface facing the object side, a negative meniscus lens L415 having a convex surface facing the image side, and a double convex positive lens L416.

The vibration reduction lens group GVR consists of, in order from the object side, a cemented lens constructed by a double convex positive lens L412 cemented with a double concave negative lens L413.

In the variable magnification optical system according to the present example with the above configuration, upon zooming from a wide angle end state to a telephoto end state, the second lens group G2 and the third lens group G3 are moved toward the image side along the optical axis such that an air distance between the first lens group G1 and the second lens group G2 is increased, an air distance between the second lens group G2 and the third lens group G3 is varied, and an air distance between the third lens group G3 and the fourth lens group G4 is varied. In this case, the first lens group G1 and the fourth lens group G4 are fixed for their positions.

In the variable magnification optical system according to the present example, the first focusing group GN in the fourth lens group G4 is moved along the optical axis toward the image side and the second focusing group GP is moved along the optical axis toward the object side to thereby conduct focusing from an infinite distance object to a close distance object.

Also, in the variable magnification optical system according to the present example, the vibration reduction lens group GVR in the fourth lens group G4 is moved so as to have a component in a direction perpendicular to the optical axis to thereby conduct the vibration reduction.

Values of specifications for the variable magnification optical system according to the present example are shown in Table 1 given below.

Table 1, the f denotes a focal length, and BF denotes a back focal length (a distance on the optical axis from the most image side lens surface to the image plane I).

In [Surface Data], Surface number denotes an order of an optical surface counted from the object side, r denotes a radius of curvature, d denotes a surface-to-surface distance (a distance between an n-th surface and an (n+1)-th surface, where n is an integer), nd denotes refractive index for d-line (wavelength: 587.6 nm) and νd denotes an Abbe number for d-line (wavelength: 587.6 nm). Further, Object surface denotes an object surface, and Variable denotes a variable surface-to-surface distance. Also, Stop S denotes an aperture stop S, Image plane denotes an image plane I. Meanwhile, radius of curvature r=∞ denotes a plane surface. Refractive index of air nd=1.000000 is omitted.

In [Various Data], FNO denotes an F-number, ω denotes a half angle of view (in a unit of degree "°"), Y denotes an image height, TL denotes a total length of the variable magnification optical system according to the present example (that is, a distance on the optical axis from the first surface of lens surface to the image plane I), and do denotes a variable distance between the n-th surface and the (n+1)th surface. In addition, W, M and T denote the wide-angle end state, intermediate focal length state and telephoto end state, respectively.

In [Lens Group Data], there are shown a starting surface number and a focal length of each lens group.

In [Values for Conditional Expressions] are shown values corresponding to the conditional expressions for the variable magnification optical system according to the present example.

It is noted, here, that "mm" is generally used as the unit of a length, such as the focal length f, the radius of curvature r, and the like shown in Table 1. However, since similar optical performance can be obtained by an optical system which is proportionally enlarged or reduced for its dimension, the unit is not necessarily limited to "mm".

The reference symbols in Table 1 described above are also used in Tables for each of the Examples provided later in the same way.

TABLE 1

First Example

[Surface Data]

| Surface number | r | d | nd | νd |
|---|---|---|---|---|
| Object surface | ∞ | | | |
| 1 | 89.536 | 1.200 | 1.761820 | 26.58 |
| 2 | 64.499 | 9.366 | 1.497820 | 82.57 |
| 3 | 492.821 | 0.100 | | |
| 4 | 75.862 | 6.550 | 1.497820 | 82.57 |
| 5 | 264.546 | Variable | | |
| 6 | 126.389 | 4.319 | 1.846660 | 23.80 |
| 7 | −94.375 | 1.200 | 1.617720 | 49.81 |
| 8 | 25.634 | 3.792 | | |
| 9 | 231.776 | 1.200 | 1.902650 | 35.72 |
| 10 | 46.195 | 4.729 | | |
| 11 | 39.709 | 3.269 | 1.805180 | 25.45 |
| 12 | 159.426 | 2.773 | | |
| 13 | −37.627 | 1.200 | 1.883000 | 40.66 |
| 14 | −110.363 | Variable | | |
| 15 | 1669.225 | 5.089 | 1.816000 | 46.59 |
| 16 | −27.674 | 1.200 | 1.950000 | 29.37 |
| 17 | −57.219 | Variable | | |
| 18(Stop S) | ∞ | 0.100 | | |
| 19 | 128.237 | 3.498 | 1.883000 | 40.66 |
| 20 | −84.529 | 0.200 | | |
| 21 | 38.419 | 5.579 | 1.518600 | 69.89 |
| 22 | −52.514 | 1.200 | 1.902000 | 25.26 |
| 23 | 574.136 | Variable | | |
| 24 | −100.148 | 1.200 | 1.902650 | 35.72 |
| 25 | 38.967 | 2.586 | | |
| 26 | −70.460 | 1.200 | 1.749500 | 35.25 |
| 27 | 23.945 | 5.990 | 1.805180 | 25.45 |
| 28 | −51.890 | Variable | | |
| 29 | 33.327 | 3.074 | 1.693500 | 53.20 |
| 30 | 119.457 | 0.100 | | |
| 31 | 104.887 | 1.200 | 1.950000 | 29.37 |
| 32 | 24.444 | 5.209 | 1.516800 | 63.88 |
| 33 | −46.867 | 0.100 | | |

TABLE 1-continued

First Example

| 34 | 37.520 | 2.904 | 1.640000 | 60.19 |
|---|---|---|---|---|
| 35 | 224.916 | Variable | | |
| 36 | 30.011 | 1.200 | 1.883000 | 40.66 |
| 37 | 18.287 | 4.085 | | |
| 38 | 76.702 | 3.755 | 1.846660 | 23.80 |
| 39 | −23.239 | 1.200 | 1.883000 | 40.66 |
| 40 | 28.635 | 5.759 | | |
| 41 | 35.576 | 2.746 | 1.487490 | 70.32 |
| 42 | 81.503 | 3.814 | | |
| 43 | −27.066 | 1.200 | 1.883000 | 40.66 |
| 44 | −67.449 | 0.100 | | |
| 45 | 51.239 | 3.982 | 1.719990 | 50.27 |
| 46 | −496.232 | BF | | |
| Image plane | ∞ | | | |

[Various Data]
Variable magnification ratio (zoom ratio) 2.75

| | W | M | T |
|---|---|---|---|
| f | 71.4 | 140.0 | 196.0 |
| FNO | 4.1 | 4.1 | 4.1 |
| ω | 17.0° | 8.7° | 6.2° |
| Y | 21.6 | 21.6 | 21.6 |
| TL | 219.319 | 219.319 | 219.319 |
| BF | 37.319 | 37.319 | 37.319 |

<Infinite focusing state>

| | W | M | T |
|---|---|---|---|
| d5 | 1.000 | 37.026 | 47.716 |
| d14 | 24.799 | 11.690 | 1.000 |
| d17 | 23.916 | 1.000 | 1.000 |
| d23 | 1.770 | 1.770 | 1.770 |
| d28 | 21.537 | 21.537 | 21.537 |
| d35 | 1.000 | 1.000 | 1.000 |

<Close distance focusing state (photographic distance 0.36 m)>

| | W | M | T |
|---|---|---|---|
| d5 | 1.000 | 37.026 | 47.716 |
| d14 | 24.799 | 11.690 | 1.000 |
| d17 | 23.916 | 1.000 | 1.000 |
| d23 | 3.564 | 6.906 | 12.167 |
| d28 | 17.949 | 11.266 | 0.743 |
| d35 | 2.794 | 6.136 | 11.397 |

[Lens Group data]

| Group | Starting surface | f |
|---|---|---|
| 1 | 1 | 123.989 |
| 2 | 6 | −31.623 |
| 3 | 15 | 81.447 |
| 4 | 18 | 109.876 |

[Values for Conditional Expressions]

| (1-1) | |fvr|/f4 = 0.45 |
|---|---|
| (1-2) | (−fn)/f4 = 0.42 |
| (1-3) | fp/f4 = 0.30 |
| (1-4) | D/D4 = 0.25 |
| (2-1) | fp/f4 = 0.30 |
| (2-2) | (−fn)/f4 = 0.42 |
| (2-3) | |fvr|/f4 = 0.45 |
| (2-4) | D/D4 = 0.25 |

Figure 2A:
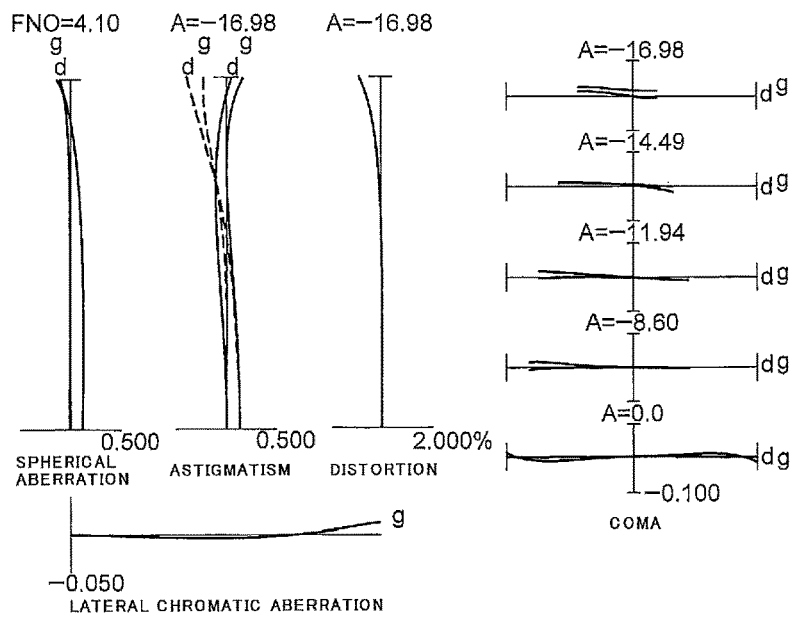
FIGS. 2A and 2B are graphs showing various aberrations of the variable magnification optical system according to the first Example of the present application in a wide-angle end state, upon focusing on an infinitely distant object, and upon focusing on a close distance object, respectively.
Figure 2B:
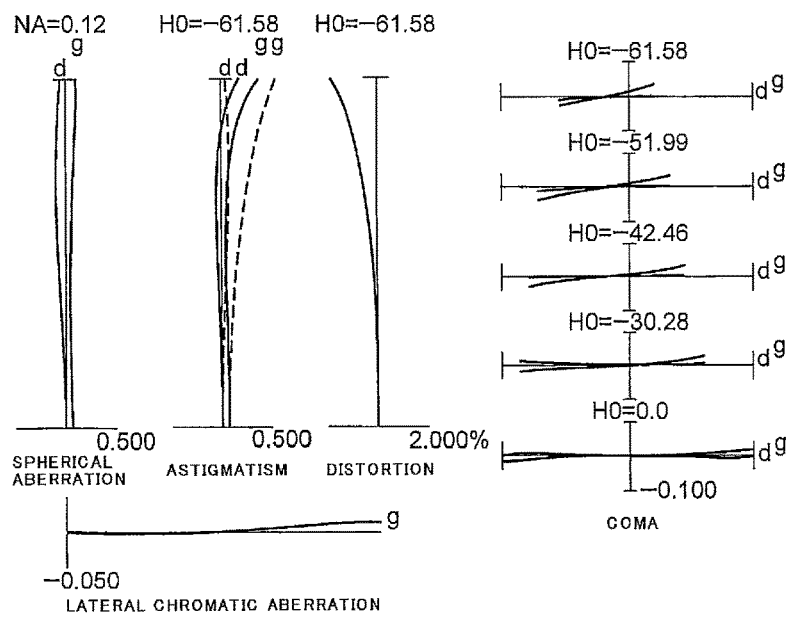
Figure 2C:
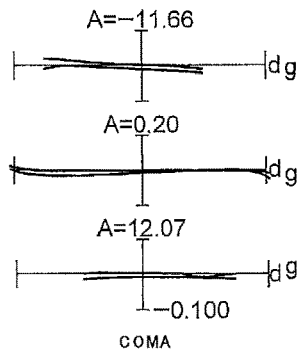
FIG. 2C is a graph showing a coma aberration of the variable magnification optical system when the vibration reduction is conducted upon focusing on an infinitely distant object.

FIGS. 2A and 2B are graphs showing various aberrations of the variable magnification optical system according to the first Example of the present application in a wide-angle end state, upon focusing on an infinitely distant object, and upon focusing on a close distance object, respectively, and FIG. 2C is a graph showing a coma aberration of the variable magnification optical system when the vibration reduction is conducted upon focusing on an infinitely distant object.

Figure 3A:
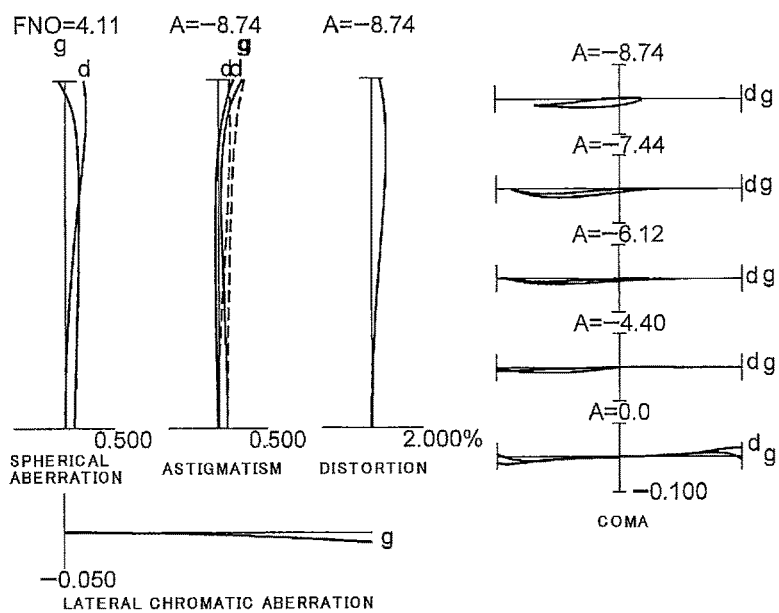
FIGS. 3A and 3B are graphs showing various aberrations of the variable magnification optical system according to the first Example of the present application in an intermediate focal length state, upon focusing on an infinitely distant object, and upon focusing on a close distance object, respectively.
Figure 3B:
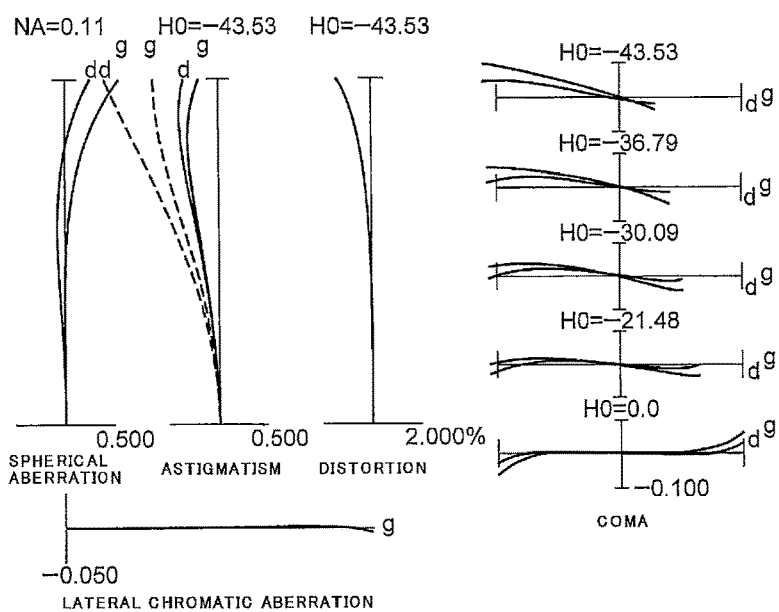
Figure 3C:
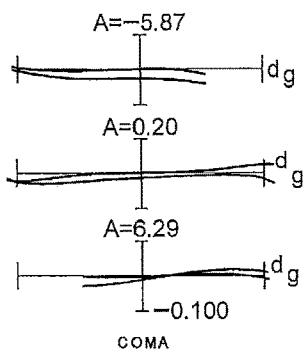
FIG. 3C is a graph showing a coma aberration of the variable magnification optical system when the vibration reduction is conducted upon focusing on an infinitely distant object.

FIGS. 3A and 3B are graphs showing various aberrations of the variable magnification optical system according to the first Example of the present application in an intermediate focal length state, upon focusing on an infinitely distant object, and upon focusing on a close distance object, respectively, and FIG. 3C is a graph showing a coma aberration of the variable magnification optical system when the vibration reduction is conducted upon focusing on an infinitely distant object.

Figure 4A:
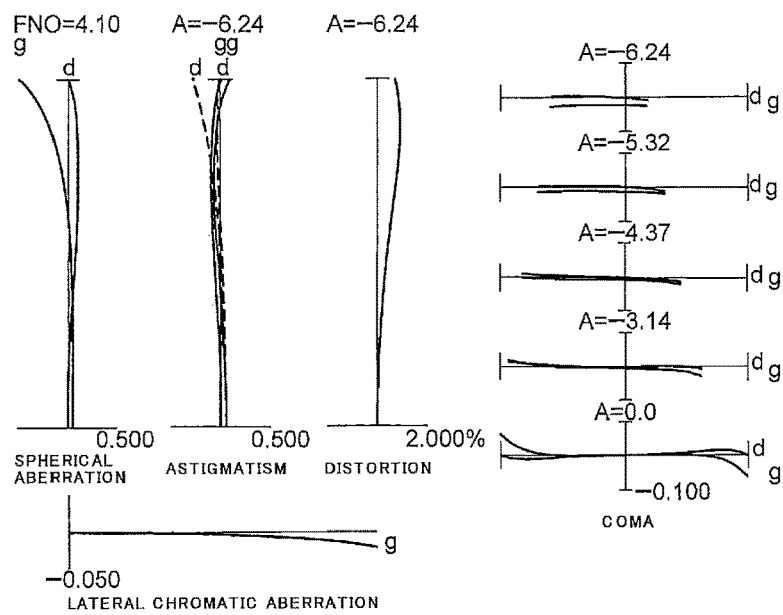
FIGS. 4A and 4B are graphs showing various aberrations of the variable magnification optical system according to the first Example of the present application in a telephoto end state, upon focusing on an infinitely distant object, and upon focusing on a close distance object, respectively.
Figure 4B:
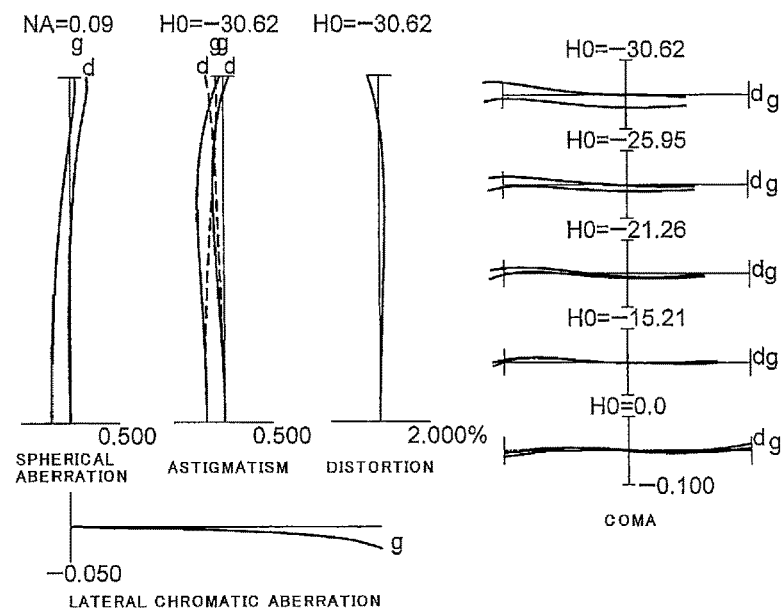
Figure 4C:
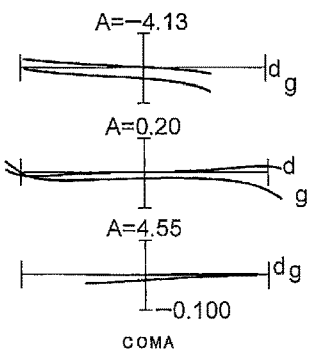
FIG. 4C is a graph showing a coma aberration of the variable magnification optical system when the vibration reduction is conducted upon focusing on an infinitely distant object.

FIGS. 4A and 4B are graphs showing various aberrations of the variable magnification optical system according to the first Example of the present application in a telephoto end state, upon focusing on an infinitely distant object, and upon focusing on a close distance object, respectively, and FIG. 4C is a graph showing a coma aberration of the variable magnification optical system when the vibration reduction is conducted upon focusing on an infinitely distant object.

In the aberration graphs, FNO denotes an F-number, NA denotes a numerical aperture, A denotes a half angle of view (in degree "°"), and H0 denotes an object height. More particularly, in the graphs of spherical aberration are shown values for the F-number FNO, corresponding to the maximum aperture, or values of the numerical aperture NA. In the graphs of astigmatism and distortion are shown maximum values for the half angle of view A or the object height H0. In the graphs of coma are shown values for the half angles of view A or the object heights H0. In the graphs, d denotes an aberration curve at d-line (wavelength: 587.6 nm), and g denotes an aberration curve at g-line (wavelength: 435.8 nm). In the astigmatism graphs, the solid line indicates a sagittal image plane, and the broken line indicates a meridional image plane. In the graphs of coma are shown coma aberrations for the half angles of view A or the object heights H0. Incidentally, the same symbols as in the present example are used also in various aberration graphs in each of the Examples given later.

As is seen from the aberration graphs, the variable magnification optical system according to the present example shows superb optical performance over the range from the wide-angle end state to the telephoto end state and exhibits excellent optical performance also when the vibration reduction is conducted.

Second Example

FIG. 5 shows a sectional view of a variable magnification optical system in a wide-angle end state according to a second Example common to the first and the second Embodiments of the present application.

The variable magnification optical system according to the present example is composed of, in order from the object side, a first lens group G1 having positive refractive power, a second lens group G2 having negative refractive power, a third lens group G3 having positive refractive power, and a fourth lens group G4 having positive refractive power.

The first lens group G1 consists of, in order from the object side, a cemented lens constructed by a negative meniscus lens L101 having a convex surface facing the object side cemented with a double convex positive lens L102, and a positive meniscus lens L103 having a convex surface facing the object side.

The second lens group G2 consists of, in order from the object side, a negative meniscus lens L201 having a convex surface facing the object side, a cemented lens constructed by a double concave negative lens L202 cemented with a double convex positive lens L203, and a negative meniscus lens L204 having a convex surface facing the image side.

The third lens group G3 consists of, in order from the object side, a cemented lens constructed by a negative meniscus lens L301 having a convex surface facing the object side cemented with a double convex positive lens L302.

The fourth lens group G4 consists of, in order from the object side, a first fixed lens group G41 having positive refractive power, a focusing lens group GF having positive refractive power, and a second fixed lens group G42 having negative refractive power.

The first fixed lens group G41 consists of, in order from the object side, a double convex positive lens L401, an aperture stop S, a positive meniscus lens L402 having a convex surface facing the object side, and a positive meniscus lens L403 having a convex surface facing the object side.

The focusing lens group GF consists of, in order from the object side, a first focusing group GN having negative refractive power and a second focusing group GP having positive refractive power.

The first focusing group GN consists of, in order from the object side, a cemented lens constructed by a double concave negative lens L404 cemented with a positive meniscus lens L405 having a convex surface facing the object side.

The second focusing group GP consists of, in order from the object side, a cemented lens constructed by a negative meniscus lens L406 having a convex surface facing the object side cemented with a double convex positive lens L407, a double convex positive lens L408, and a double convex positive lens L409.

The second fixed lens group G42 consists of, in order from the object side, a negative meniscus lens L410 having a convex surface facing the object side, a vibration reduction lens group GVR having negative refractive power, a negative meniscus lens L413 having a convex surface facing the image side, a double convex positive lens L414, a negative meniscus lens L415 having a convex surface facing the image side, and a double convex positive lens L416.

The vibration reduction lens group GVR consists of, in order from the object side, a cemented lens constructed by a negative meniscus lens L411 having a convex surface facing the object side cemented with a positive meniscus lens L412 having a convex surface facing the object side.

In the variable magnification optical system according to the present example with the above configuration, upon zooming from a wide angle end state to a telephoto end state, the second lens group G2 and the third lens group G3 are moved toward the image side along the optical axis such that an air distance between the first lens group G1 and the second lens group G2 is increased, an air distance between the second lens group G2 and the third lens group G3 is varied, and an air distance between the third lens group G3 and the fourth lens group G4 is varied. At that time, the first lens group G1 and the fourth lens group G4 are fixed for their positions.

In the variable magnification optical system according to the present example, the first focusing group GN in the fourth lens group G4 is moved along the optical axis toward the image side and the second focusing group GP is moved along the optical axis toward the object side to thereby conduct focusing from an infinitely distance object to a close distance object.

Also, in the variable magnification optical system according to the present example, the vibration reduction lens group GVR in the fourth lens group G4 is moved so as to contain a component in a direction perpendicular to the optical axis to thereby conduct the vibration reduction.

Values of specifications for the variable magnification optical system according to the present example are shown in Table 2 given below.

TABLE 2

Second Example

[Surface Data]

| Surface number | r | d | nd | νd |
|---|---|---|---|---|
| Object surface | ∞ | | | |
| 1 | 87.518 | 1.200 | 1.846660 | 23.80 |
| 2 | 65.375 | 11.303 | 1.433848 | 95.23 |
| 3 | −521.284 | 0.100 | | |
| 4 | 69.096 | 7.026 | 1.497820 | 82.57 |
| 5 | 259.776 | Variable | | |
| 6 | 92.515 | 1.200 | 1.883000 | 40.66 |
| 7 | 29.776 | 5.926 | | |
| 8 | −92.500 | 1.200 | 1.516800 | 63.88 |
| 9 | 31.244 | 5.682 | 1.846660 | 23.80 |
| 10 | −1012.688 | 14.564 | | |
| 11 | −44.515 | 1.200 | 1.950000 | 29.37 |
| 12 | −127.638 | Variable | | |
| 13 | 99.131 | 1.200 | 1.950000 | 29.37 |
| 14 | 41.603 | 5.065 | 1.677900 | 50.67 |
| 15 | −88.036 | Variable | | |
| 16 | 184.530 | 2.883 | 1.497820 | 82.57 |
| 17 | −127.449 | 0.100 | | |
| 18(Stop S) | ∞ | 0.100 | | |
| 19 | 68.409 | 2.965 | 1.497820 | 82.57 |
| 20 | 2003.175 | 0.100 | | |
| 21 | 39.865 | 3.276 | 1.497820 | 82.57 |
| 22 | 126.969 | Variable | | |
| 23 | −93.904 | 1.200 | 1.651000 | 56.24 |
| 24 | 16.856 | 3.445 | 1.850260 | 32.35 |
| 25 | 25.191 | Variable | | |
| 26 | 35.428 | 1.200 | 1.846660 | 23.80 |
| 27 | 21.655 | 5.108 | 1.497820 | 82.57 |
| 28 | −171.432 | 0.100 | | |
| 29 | 33.206 | 3.538 | 1.497820 | 82.57 |
| 30 | −872.482 | 0.100 | | |
| 31 | 39.698 | 3.189 | 1.497820 | 82.57 |
| 32 | −218.559 | Variable | | |
| 33 | 34.641 | 1.200 | 1.883000 | 40.66 |
| 34 | 17.547 | 4.063 | | |
| 35 | 108.037 | 1.200 | 1.883000 | 40.66 |
| 36 | 17.905 | 2.721 | 1.846660 | 23.80 |
| 37 | 31.029 | 5.953 | | |
| 38 | −20.014 | 1.200 | 1.834810 | 42.73 |
| 39 | −33.721 | 0.100 | | |
| 40 | 155.950 | 5.037 | 1.805180 | 25.45 |
| 41 | −26.603 | 5.976 | | |
| 42 | −21.724 | 1.200 | 1.883000 | 40.66 |
| 43 | −91.209 | 0.100 | | |
| 44 | 42.254 | 4.806 | 1.497820 | 82.57 |
| 45 | −300.388 | BF | | |
| Image plane | ∞ | | | |

[Various Data]
Variable magnification ratio 2.75

| | W | M | T |
|---|---|---|---|
| f | 71.4 | 140.0 | 196.0 |
| FNO | 4.1 | 4.1 | 4.1 |
| ω | 17.1° | 8.7° | 6.20° |
| Y | 21.6 | 21.6 | 21.6 |
| TL | 219.219 | 219.219 | 219.219 |
| BF | 37.319 | 37.319 | 37.319 |

<Infinite focusing state>

| | W | M | T |
|---|---|---|---|
| d5 | 1.000 | 28.185 | 36.224 |
| d12 | 31.750 | 14.785 | 1.000 |
| d15 | 11.220 | 1.000 | 6.746 |

TABLE 2-continued

Second Example

| d22 | 2.609 | 2.609 | 2.609 |
|---|---|---|---|
| d25 | 17.785 | 17.785 | 17.785 |
| d32 | 1.000 | 1.000 | 1.000 |

<Close distance focusing state
(photographic distance 0.38 m)>

| | W | M | T |
|---|---|---|---|
| d5 | 1.000 | 28.185 | 36.224 |
| d12 | 31.750 | 14.785 | 1.000 |
| d15 | 11.220 | 1.000 | 6.746 |
| d22 | 3.875 | 6.493 | 10.683 |
| d25 | 15.253 | 10.018 | 1.637 |
| d32 | 2.266 | 4.883 | 9.073 |

[Lens Group data]

| Group | Starting surface | f |
|---|---|---|
| 1 | 1 | 106.207 |
| 2 | 6 | −31.224 |
| 3 | 13 | 93.767 |
| 4 | 16 | 115.857 |

[Values for Conditional Expressions]

| (1-1) | $|fvr|/f4 = 0.42$ |
|---|---|
| (1-2) | $(-fn)/f4 = 0.30$ |
| (1-3) | $fp/f4 = 0.22$ |
| (1-4) | $D/D4 = 0.22$ |
| (2-1) | $fp/f4 = 0.22$ |
| (2-2) | $(-fn)/f4 = 0.30$ |
| (2-3) | $|fvr|/f4 = 0.42$ |
| (2-4) | $D/D4 = 0.22$ |

Figure 6A:
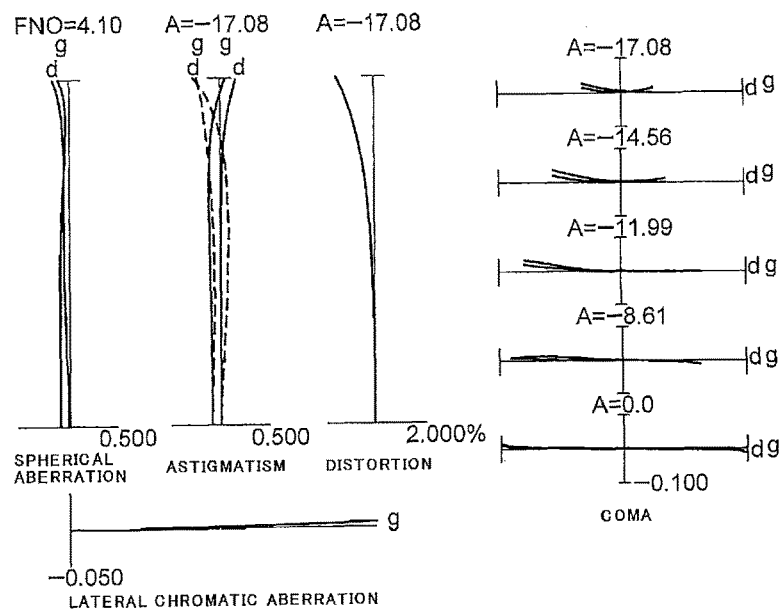
FIGS. 6A and 6B are graphs showing various aberrations of the variable magnification optical system according to the second Example of the present application in a wide-angle end state, upon focusing on an infinitely distant object, and upon focusing on a close distance object, respectively.
Figure 6B:
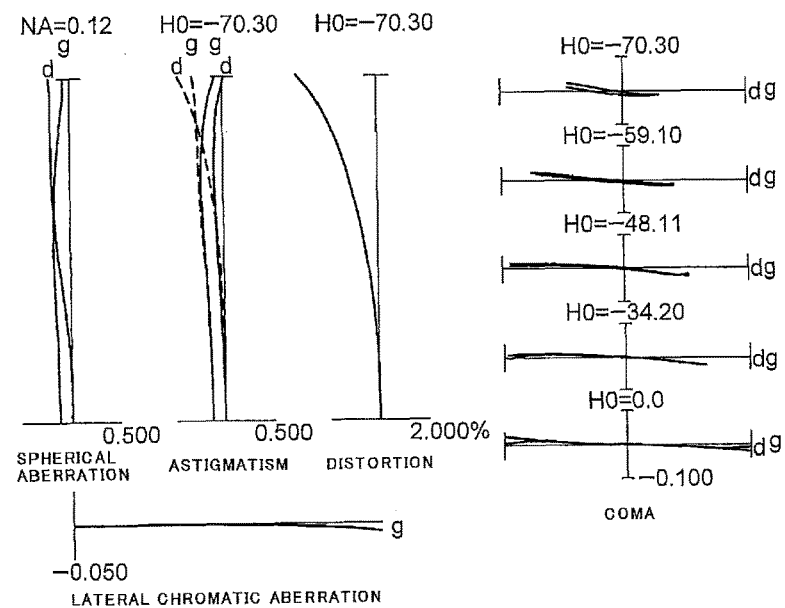
Figure 6C:
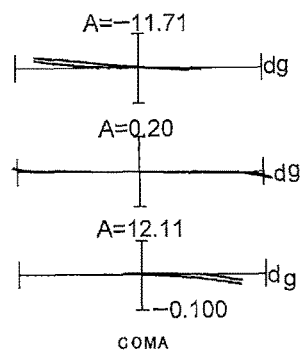
FIG. 6C is a graph showing a coma aberration of the variable magnification optical system when the vibration reduction is conducted upon focusing on an infinitely distant object.

FIGS. 6A and 6B are graphs showing various aberrations of the variable magnification optical system according to the second Example of the present application in a wide-angle end state, upon focusing on an infinitely distant object, and upon focusing on a close distance object, respectively, and FIG. 6C is a graph showing a coma aberration of the variable magnification optical system when the vibration reduction is conducted upon focusing on an infinitely distant object.

Figure 7A:
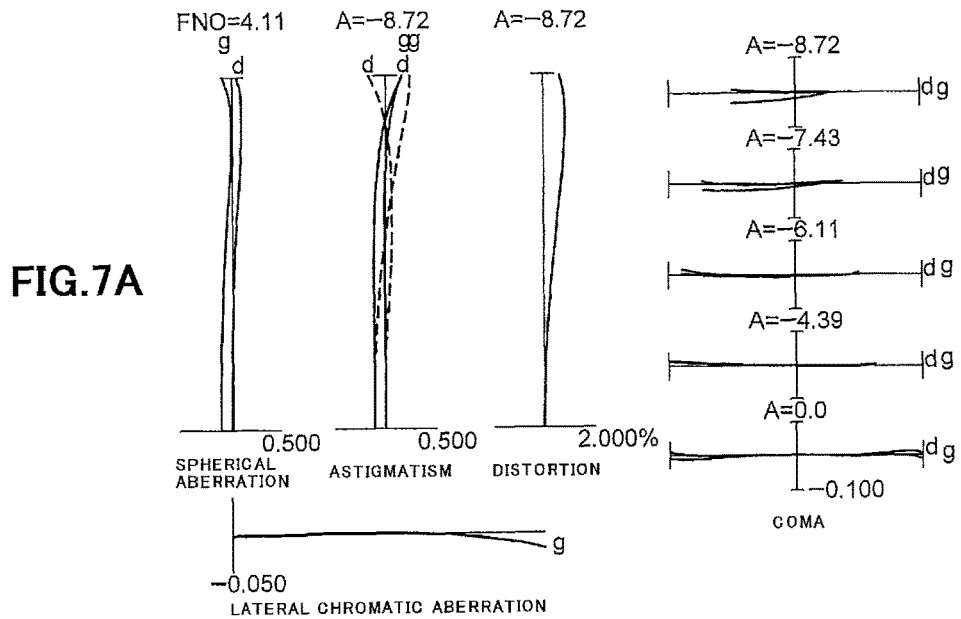
FIGS. 7A and 7B are graphs showing various aberrations of the variable magnification optical system according to the second Example of the present application in an intermediate focal length state, upon focusing on an infinitely distant object, and upon focusing on a close distance object, respectively.
Figure 7B:
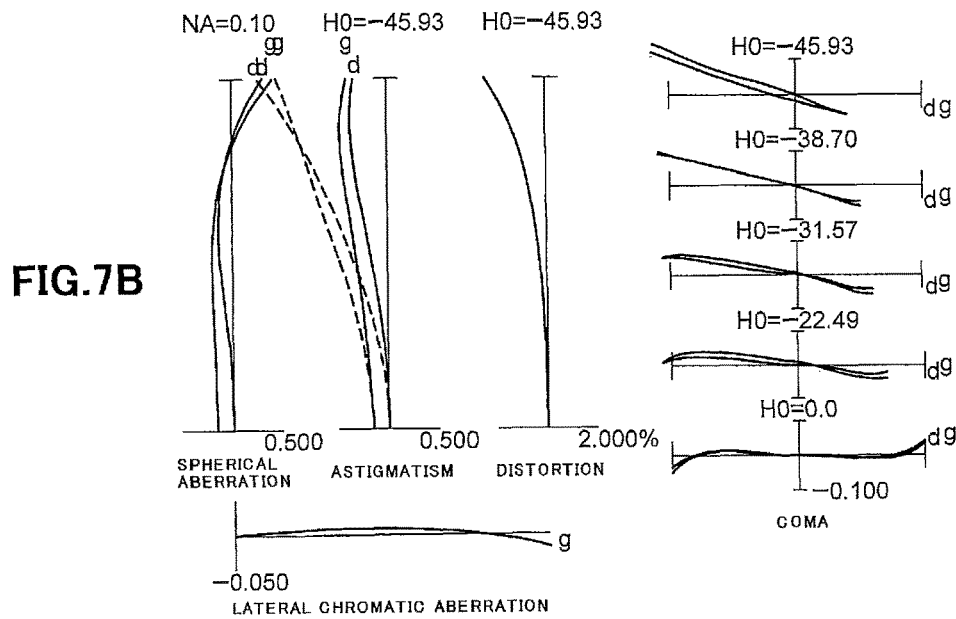
Figure 7C:
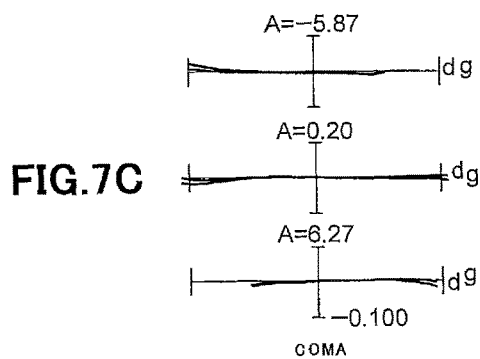
FIG. 7C is a graph showing a coma aberration of the variable magnification optical system when the vibration reduction is conducted upon focusing on an infinitely distant object.

FIGS. 7A and 7B are graphs showing various aberrations of the variable magnification optical system according to the second Example of the present application in an intermediate focal length state, upon focusing on an infinitely distant object, and upon focusing on a close distance object, respectively, and FIG. 7C is a graph showing a coma aberration of the variable magnification optical system when the vibration reduction is conducted upon focusing on an infinitely distant object.

Figure 8A:
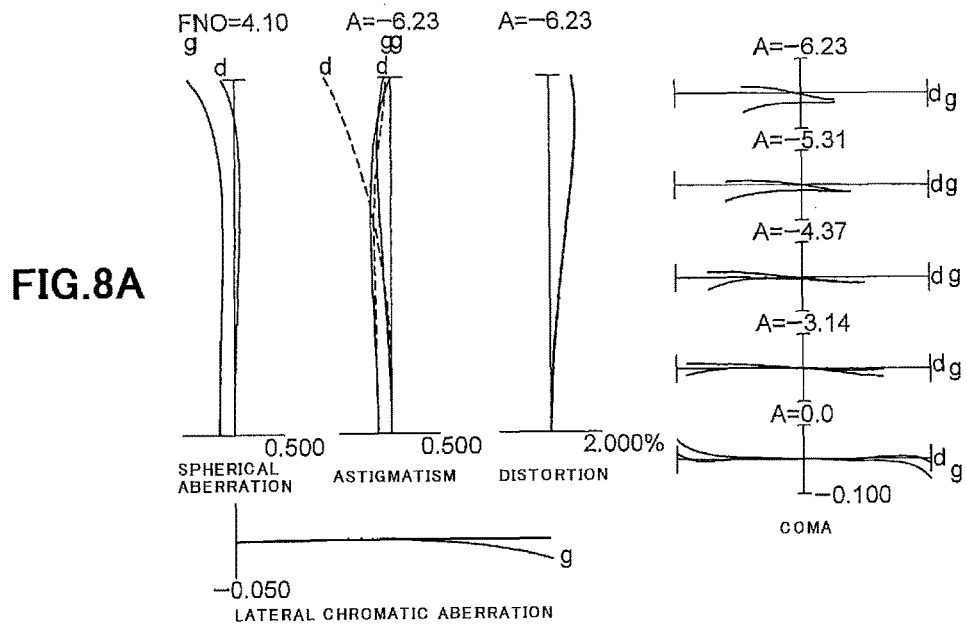
FIGS. 8A and 8B are graphs showing various aberrations of the variable magnification optical system according to the second Example of the present application in a telephoto end state, upon focusing on an infinitely distant object, and upon focusing on a close distance object, respectively.
Figure 8B:
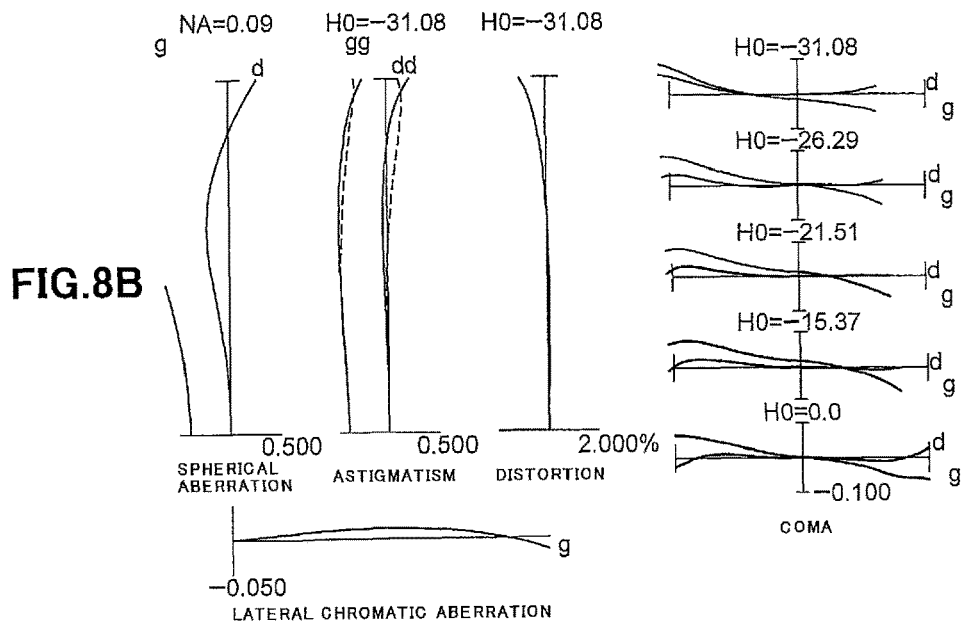
Figure 8C:
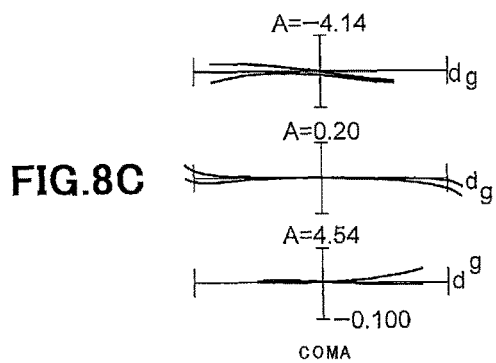
FIG. 8C is a graph showing a coma aberration of the variable magnification optical system when the vibration reduction is conducted upon focusing on an infinitely distant object.

FIGS. 8A and 8B are graphs showing various aberrations of the variable magnification optical system according to the second Example of the present application in a telephoto end state, upon focusing on an infinitely distant object, and upon focusing on a close distance object, respectively, and FIG. 8C is a graph showing a coma aberration of the variable magnification optical system when the vibration reduction is conducted upon focusing on an infinitely distant object.

As is seen from the aberration graphs, the variable magnification optical system according to the present example shows superb optical performance over the range from the wide-angle end state to the telephoto end state and exhibits excellent optical performance also when the vibration reduction is conducted.

Third Example

FIG. 9 shows a sectional view of a variable magnification optical system in a wide-angle end state according to a third Example common to the first and the second Embodiments of the present application.

The variable magnification optical system according to the present example is composed of, in order from the object side, a first lens group G1 having positive refractive power, a second lens group G2 having negative refractive power, a third lens group G3 having positive refractive power, and a fourth lens group G4 having positive refractive power.

The first lens group G1 consists of, in order from the object side, a cemented lens constructed by a negative meniscus lens L101 having a convex surface facing the object side cemented with a double convex positive lens L102, and a positive meniscus lens L103 having a convex surface facing the object side.

The second lens group G2 consists of, in order from the object side, a negative meniscus lens L201 having a convex surface facing the object side, a cemented lens constructed by a double concave negative lens L202 cemented with a positive meniscus lens L203 having a convex surface facing the object side, and a negative meniscus lens L204 having a convex surface facing the image side.

The third lens group G3 consists of, in order from the object side, a cemented lens constructed by a negative meniscus lens L301 having a convex surface facing the object side cemented with a double convex positive lens L302.

The fourth lens group G4 consists of, in order from the object side, a first fixed lens group G41 having positive refractive power, a focusing lens group GF having positive refractive power, and a second fixed lens group G42 having negative refractive power.

The first fixed lens group G41 consists of, in order from the object side, a double convex positive lens L401, an aperture stop S, a positive meniscus lens L402 having a convex surface facing the object side, and a positive meniscus lens L403 having a convex surface facing the object side.

The focusing lens group GF consists of, in order from the object side, a first focusing group GN having negative refractive power and a second focusing group GP having positive refractive power.

The first focusing group GN consists of, in order from the object side, a cemented lens constructed by a double concave negative lens L404 cemented with a positive meniscus lens L405 having a convex surface facing the object side.

The second focusing group GP consists of, in order from the object side, a cemented lens constructed by a negative meniscus lens L406 having a convex surface facing the object side cemented with a double convex positive lens L407, a double convex positive lens L408, and a double convex positive lens L409.

The second fixed lens group G42 consists of, in order from the object side, a negative meniscus lens L410 having a convex surface facing the object side, a vibration reduction lens group GVR having negative refractive power, a negative meniscus lens L413 having a convex surface facing the image side, a double convex positive lens L414, a negative meniscus lens L415 having a convex surface facing the image side, and a positive meniscus lens L416 having a convex surface facing the object side.

The vibration reduction lens group GVR consists of, in order from the object side, a cemented lens constructed by a negative meniscus lens L411 having a convex surface facing the object side cemented with a positive meniscus lens L412 having a convex surface facing the object side.

In the variable magnification optical system according to the present example with the above configuration, upon zooming from a wide-angle end state to a telephoto end state, the second lens group G2 and the third lens group G3 are moved toward the image side along the optical axis such that an air distance between the first lens group G1 and the second lens group G2 is increased, an air distance between the second lens group G2 and the third lens group G3 is varied, and an air distance between the third lens group G3 and the fourth lens group G4 is varied. At that time, the first lens group G1 and the fourth lens group G4 are fixed for their positions.

In the variable magnification optical system according to the present example, the first focusing group GN in the fourth lens group G4 is moved along the optical axis toward the image side and the second focusing group GP is moved along the optical axis toward the object side to thereby conduct focusing from an infinitely distance object to a close distance object.

Also, in the variable magnification optical system according to the present example, the vibration reduction lens group GVR in the fourth lens group G4 is moved so as to contain a component in a direction perpendicular to the optical axis to thereby conduct the vibration reduction.

Values of specifications for the variable magnification optical system according to the present example are shown in Table 3 given below.

TABLE 3

Third Example

[Surface Data]

| Surface number | r | d | nd | vd |
|---|---|---|---|---|
| Object surface | ∞ | | | |
| 1 | 83.2391 | 1.200 | 1.805180 | 25.45 |
| 2 | 62.0687 | 11.453 | 1.433848 | 95.23 |
| 3 | −651.7790 | 0.100 | | |
| 4 | 65.4552 | 7.206 | 1.433848 | 95.23 |
| 5 | 253.2044 | Variable | | |
| 6 | 95.5535 | 1.200 | 1.883000 | 40.66 |
| 7 | 29.5434 | 5.992 | | |
| 8 | −86.3695 | 1.200 | 1.497820 | 82.57 |
| 9 | 31.7368 | 5.301 | 1.846660 | 23.80 |
| 10 | 578.5867 | 18.487 | | |
| 11 | −40.7518 | 1.200 | 1.902000 | 25.26 |
| 12 | −74.2042 | Variable | | |
| 13 | 102.8697 | 1.200 | 1.950000 | 29.37 |
| 14 | 43.1725 | 4.960 | 1.670030 | 47.14 |
| 15 | −89.2434 | Variable | | |
| 16 | 204.9923 | 2.866 | 1.497820 | 82.57 |
| 17 | −121.8504 | 0.100 | | |
| 18(Stop S) | ∞ | 0.100 | | |
| 19 | 68.7782 | 2.974 | 1.497820 | 82.57 |
| 20 | 3503.5297 | 0.100 | | |
| 21 | 39.1139 | 3.291 | 1.497820 | 82.57 |
| 22 | 123.1531 | Variable | | |
| 23 | −98.9742 | 1.200 | 1.651600 | 58.57 |
| 24 | 16.6522 | 3.495 | 1.834000 | 37.18 |
| 25 | 24.9923 | Variable | | |
| 26 | 35.1436 | 1.200 | 1.846660 | 23.80 |
| 27 | 21.9360 | 5.242 | 1.497820 | 82.57 |
| 28 | −240.8524 | 0.100 | | |
| 29 | 33.8985 | 3.887 | 1.497820 | 82.57 |
| 30 | −250.0536 | 0.155 | | |
| 31 | 48.2044 | 3.232 | 1.497820 | 82.57 |
| 32 | −221.4035 | Variable | | |
| 33 | 34.8138 | 1.200 | 1.883000 | 40.66 |
| 34 | 18.4001 | 4.275 | | |
| 35 | 136.9381 | 1.200 | 1.883000 | 40.66 |

TABLE 3-continued

Third Example

| | | | | |
|---|---|---|---|---|
| 36 | 19.0438 | 2.715 | 1.846660 | 23.80 |
| 37 | 31.9873 | 6.398 | | |
| 38 | −20.0907 | 1.200 | 1.834810 | 42.73 |
| 39 | −31.8848 | 0.100 | | |
| 40 | 154.9619 | 5.445 | 1.805180 | 25.45 |
| 41 | −26.2808 | 5.267 | | |
| 42 | −21.4608 | 1.200 | 1.883000 | 40.66 |
| 43 | −85.6881 | 0.100 | | |
| 44 | 41.2616 | 4.655 | 1.497820 | 82.57 |
| 45 | 74612.0510 | BF | | |
| Image plane | ∞ | | | |

[Various Data]
Variable magnification ratio 2.46

| | W | M | T |
|---|---|---|---|
| f | 72.0 | 100.0 | 177.0 |
| FNO | 4.1 | 4.1 | 4.1 |
| ω | 16.9° | 12.2° | 6.9° |
| Y | 21.6 | 21.6 | 21.6 |
| TL | 219.219 | 219.219 | 219.219 |
| BF | 37.319 | 37.319 | 37.319 |

<Infinite focusing state>

| | W | M | T |
|---|---|---|---|
| d5 | 1.000 | 16.852 | 34.493 |
| d12 | 28.834 | 21.390 | 1.000 |
| d15 | 10.397 | 1.988 | 4.737 |
| d22 | 2.595 | 2.595 | 2.595 |
| d25 | 16.869 | 16.869 | 16.869 |
| d32 | 1.000 | 1.000 | 1.000 |

<Close distance focusing state
(photographic distance 0.35 m)>

| | W | M | T |
|---|---|---|---|
| d5 | 1.000 | 16.853 | 34.493 |
| d12 | 28.834 | 21.390 | 1.000 |
| d15 | 10.397 | 1.988 | 4.737 |
| d22 | 4.171 | 5.202 | 10.453 |
| d25 | 13.717 | 11.654 | 1.151 |
| d32 | 2.576 | 3.607 | 8.858 |

[Lens Group data]

| Group | f |
|---|---|
| 1 | 108.723 |
| 2 | −32.794 |
| 3 | 98.135 |
| 4 | 115.860 |

[Values for Conditional Expressions]

| | |
|---|---|
| (1-1) | \|fvr\|/f4 = 0.40 |
| (1-2) | (−fn)/f4 = 0.30 |
| (1-3) | fp/f4 = 0.23 |
| (1-4) | D/D4 = 0.21 |
| (2-1) | fp/f4 = 0.23 |
| (2-2) | (−fn)/f4 = 0.30 |
| (2-3) | \|fvr\|/f4 = 0.40 |
| (2-4) | D/D4 = 0.21 |

Figure 10A:
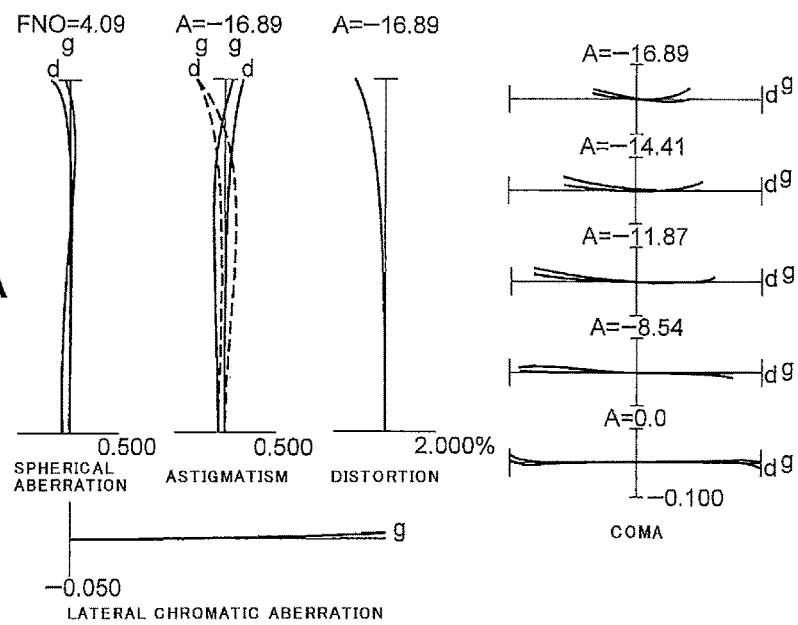
FIGS. 10A and 10B are graphs showing various aberrations of the variable magnification optical system according to the third Example of the present application in a wide-angle end state, upon focusing on an infinitely distant object, and upon focusing on a close distance object, respectively.
Figure 10B:
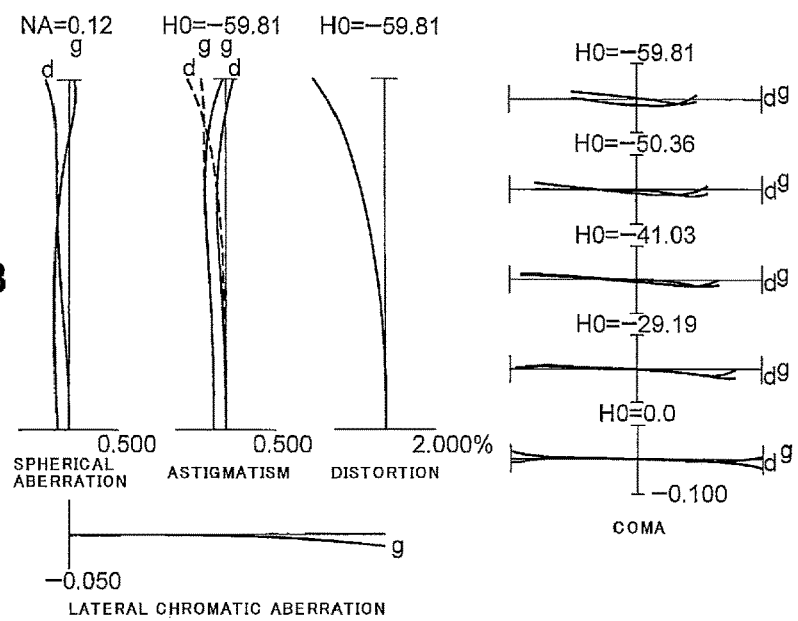
Figure 10C:
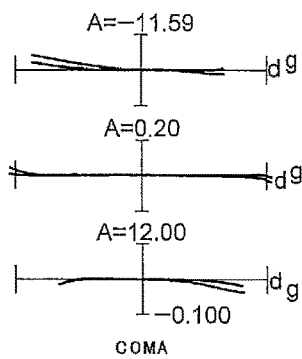
FIG. 10C is a graph showing a coma aberration of the variable magnification optical system when the vibration reduction is conducted upon focusing on an infinitely distant object.

FIGS. 10A and 10B are graphs showing various aberrations of the variable magnification optical system according to the third Example of the present application in a wide-angle end state, upon focusing on an infinitely distant object, and upon focusing on a close distance object, respectively, and FIG. 10C is a graph showing a coma aberration of the variable magnification optical system when the vibration reduction is conducted upon focusing on an infinitely distant object.

Figure 11A:
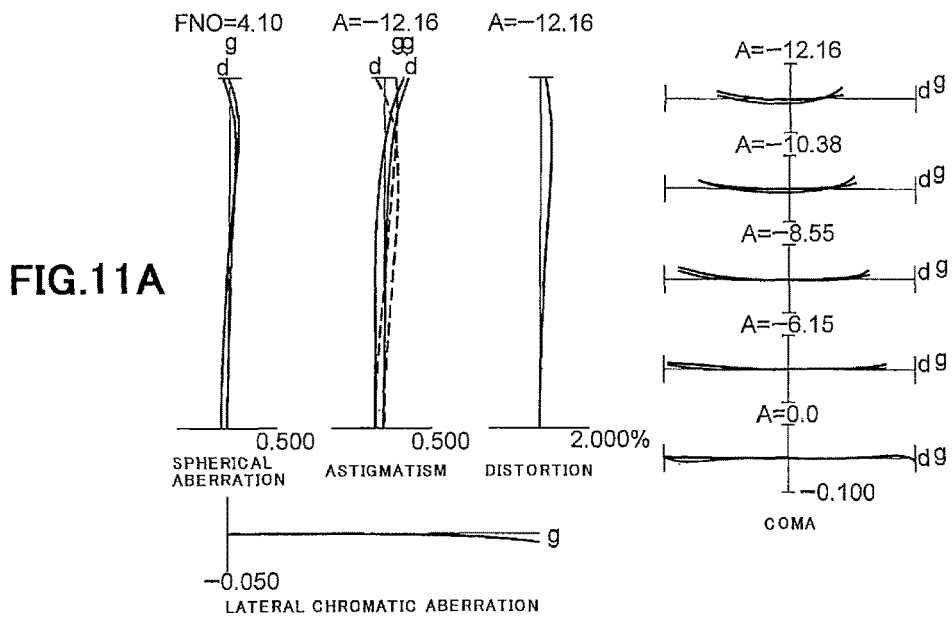
FIGS. 11A and 11B are graphs showing various aberrations of the variable magnification optical system according to the third Example of the present application in an intermediate focal length state, upon focusing on an infinitely distant object, and upon focusing on a close distance object, respectively.
Figure 11B:
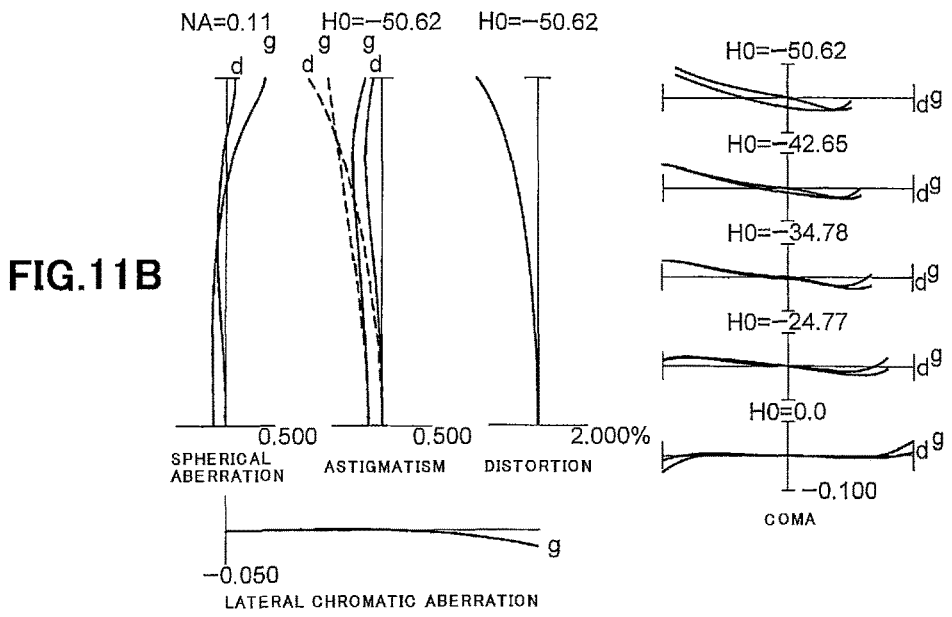
Figure 11C:
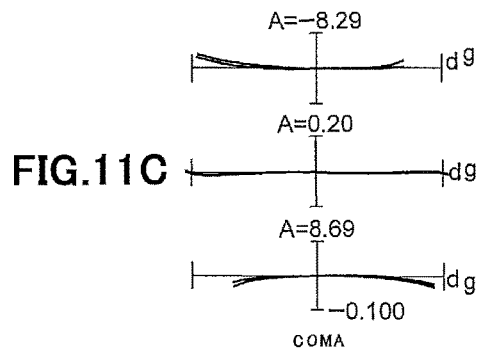
FIG. 11C is a graph showing a coma aberration of the variable magnification optical system when the vibration reduction is conducted upon focusing on an infinitely distant object.

FIGS. 11A and 11B are graphs showing various aberrations of the variable magnification optical system according to the third Example of the present application in an intermediate focal length state, upon focusing on an infinitely distant object, and upon focusing on a close distance object, respectively, and FIG. 11C is a graph showing a coma aberration of the variable magnification optical system when the vibration reduction is conducted upon focusing on an infinitely distant object.

Figure 12A:
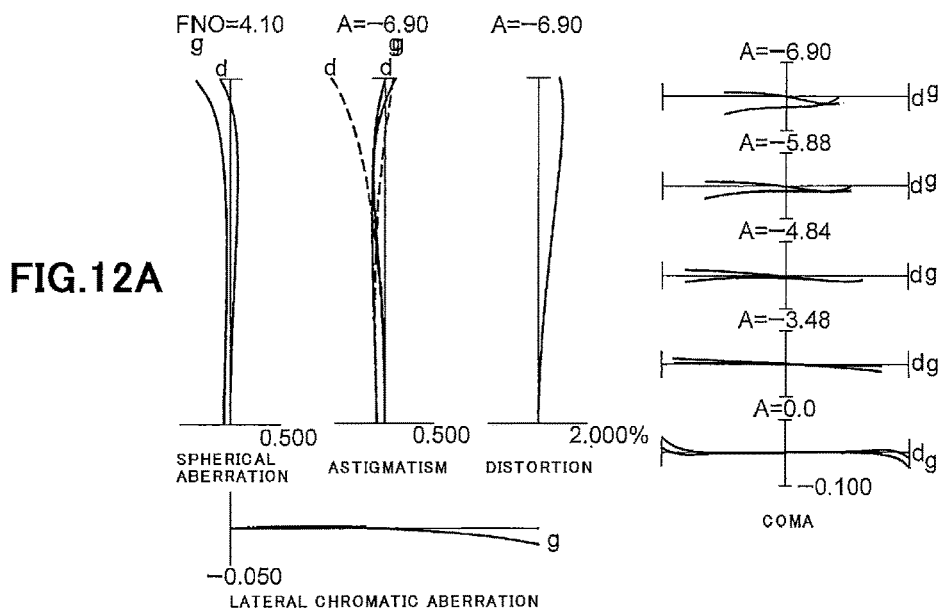
FIGS. 12A and 12B are graphs showing various aberrations of the variable magnification optical system according to the third Example of the present application in a telephoto end state, upon focusing on an infinitely distant object, and upon focusing on a close distance object, respectively.
Figure 12B:
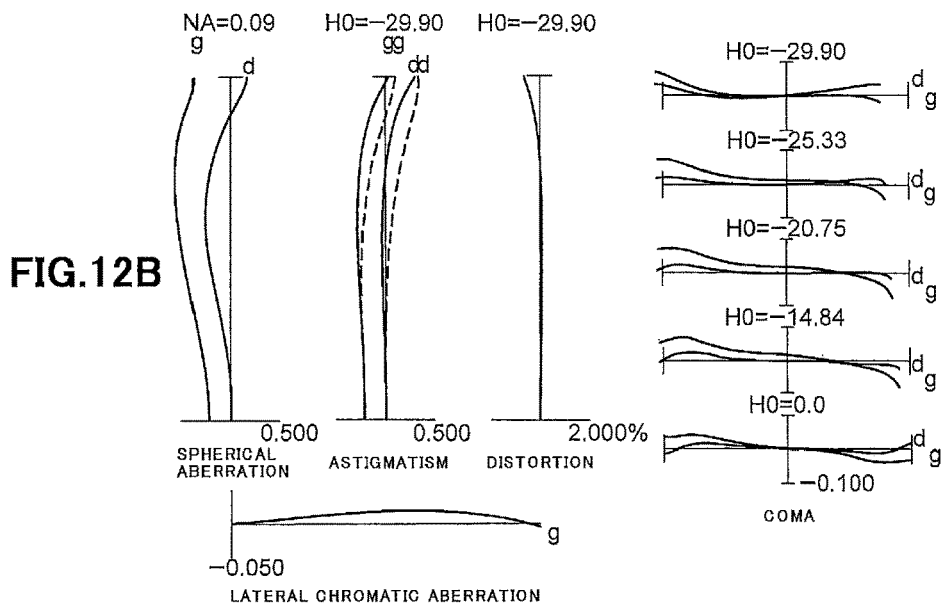
Figure 12C:
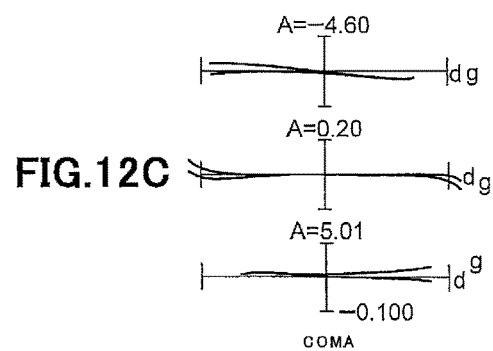
FIG. 12C is a graph showing a coma aberration of the variable magnification optical system when the vibration reduction is conducted upon focusing on an infinitely distant object.

FIGS. 12A and 12B are graphs showing various aberrations of the variable magnification optical system according to the third Example of the present application in a telephoto end state, upon focusing on an infinitely distant object, and upon focusing on a close distance object, respectively, and FIG. 12C is a graph showing a coma aberration of the variable magnification optical system when the vibration reduction is conducted upon focusing on an infinitely distant object.

As is seen from the aberration graphs, the variable magnification optical system according to the present example shows superb optical performance over the range from the wide-angle end state to the telephoto end state and exhibits excellent optical performance also when the vibration reduction is conducted.

According to each of the Examples, variable magnification optical systems can be realized which have higher optical performance while exhibiting the vibration reduction function. Furthermore, the above Examples are a concrete example of the present invention, and the invention is not restricted to the Examples. The contents given below can be arbitrarily adopted so far as the optical performance of the variable magnification optical systems according to the first and the second Embodiments of the present application is not deteriorated.

Although the variable magnification optical systems each having a four-group configuration have been described above as numerical Examples of such variable magnification optical systems according to the first and the second Embodiments, the present application is not limited to them, and a variable magnification optical system having other configurations (such as, for example, five- or six-group configuration) can be constructed. Specifically, the variable magnification optical systems according to the first and the second Embodiments of the present application may have such a lens configuration that a lens or a lens group is added to the most object side or the most image side of the optical system.

Also, in the variable magnification optical systems according to the first and the second Embodiments of the present application, in order to vary focusing from an infinitely distant object to a close distant object, a part of the lens group, a single lens group in the entirety thereof, or a plurality of the lens groups may be constructed so as to be moved along the optical axis as a focusing lens group. In particular, it is preferable that at least a part of the fourth lens group is used as the focusing lens group. The focusing lens group can be applied to an auto focus and is suitable for being driven by a motor for auto focusing, such as an ultrasonic motor.

Further, the variable magnification optical systems according to the first and the second Embodiments of the present application may be constructed such that any lens group in its entirety, or a part thereof may be used as a vibration reduction lens group and moved so as to contain a component in the direction perpendicular to the optical axis or rotationally moved in an intra-plane direction including the optical axis (swayed), thereby conducting the vibration reduction. In particular, it is preferable that, in the variable magnification optical systems according to the first and the second Embodiments of the present application, at least a part of the fourth lens group is used as the vibration reduction lens group.

Also, in the variable magnification optical systems according to the first and the second Embodiments of the present application, a lens surface of the constitutional lenses may be made spherical, plane or aspherical. When the lens surface is a spherical surface or a plane surface, it is preferable because lens processing, assembling and adjustment become easy, and the optical performance can be prevented from being deteriorated by errors in the lens processing, assembling and adjustment. Also, it is preferable because even if the image plane is shifted, the deterioration in the optical performance is very little. When the lens surface is an aspherical surface, the aspherical surface may be formed by a grinding process, a glass molding process in which a glass material is formed into an aspherical shape using a mold, or a compound type process in which a resin material on a glass surface is formed into an aspherical shape. Also, the lens surface may be a diffractive optical surface, and the lens may be a gradient index lens (GRIN lens) or a plastic lens.

Also, it is preferable that, in the variable magnification optical systems according to the first and the second Embodiments of the present application, the aperture stop is disposed in the fourth lens group, and its role may be substituted by the frame of the lens without providing a constituent member as the aperture stop.

Moreover, the lens surface of the lenses constituting the variable magnification optical systems according to the first and the second Embodiments of the present application may be applied with an anti-reflection coating having a high transmittance in a broad range of wavelength. With this contrivance, it is feasible to reduce a flare as well as ghost and achieve higher contrast and higher optical performance.

Also, the variable magnification optical systems according to the first and the second Embodiments of the present application has a 35 mm equivalent focal length of about 60 to 80 mm in the wide-angle end state and a 35 mm equivalent focal length of about 150 to 200 mm in the telephoto end state. Additionally, the variable magnification optical systems according to the first and the second Embodiments of the present application have a variable magnification ratio of on the order of 1.5 to 4. Furthermore, in the variable magnification optical systems according to the first and the second Embodiments of the present application, a maximum shooting magnification beta β in any focal length state is equal to or exceeds −0.5 or equal to or falls below −1.0, and as a result, both of the close distance photographing and the variable magnification can be achieved simultaneously.

Next, a camera equipped with a variable magnification optical system according to the first and the second Embodiments of the present application will be described with referring to FIG. 13.

Figure 13:
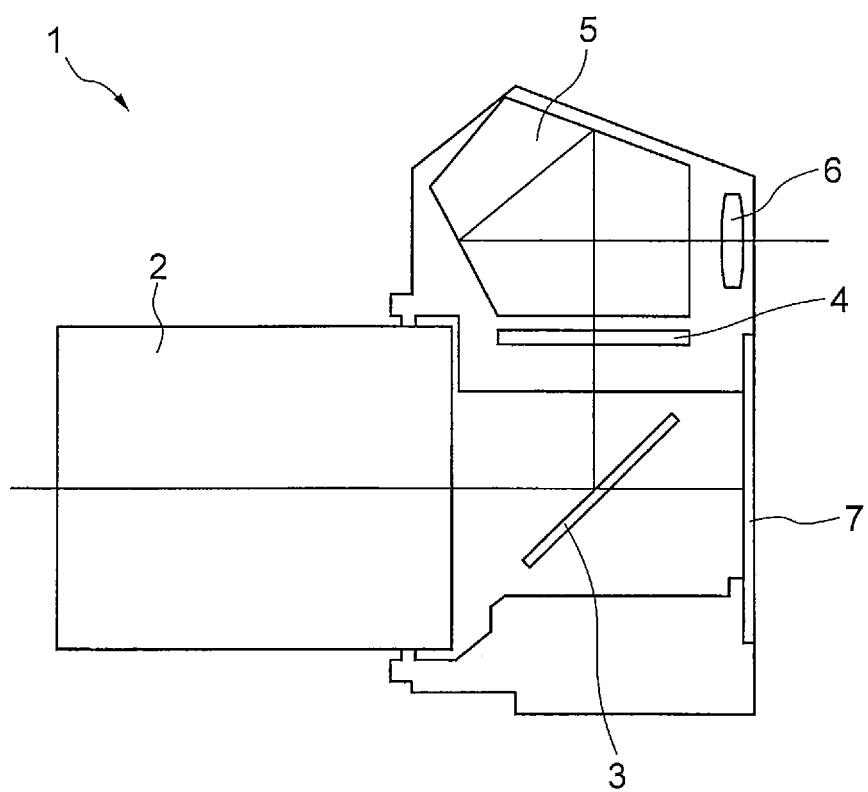
FIG. 13 is a view showing a configuration of a camera equipped with the variable magnification optical systems according to the first and the second Embodiments of the present application.

FIG. 13 is a view showing a configuration of a camera equipped with a variable magnification optical system according to the first and the second Embodiments of the present application.

The present camera 1 is an interchangeable lens, single-lens reflex digital camera equipped with the variable magnification optical system according to the above first Example as an imaging lens 2.

In the present camera 1, light emitted from an unillustrated object (an object to be photographed) is converged by the imaging lens 2, reflected by a quick return mirror 3, and focused on a focusing screen 4. The light focused on the focusing screen 4 is reflected a plurality of times in a pentagonal roof prism 5, and is led to an eyepiece 6. Accordingly, a photographer can observe the object image as an erected image through the eyepiece 6.

When the photographer presses an unillustrated release button down, the quick return mirror 3 is retracted from the optical path, and the light from the unillustrated object forms an object image on an imaging device 7. Accordingly, the light emitted from the object is captured by the imaging device 7, and stored in an unillustrated memory as a photographed image of the object. In this manner, the photographer can take a picture of an object by the camera 1.

Here, the variable magnification optical system according to the above first Example installed as the imaging lens 2 in the camera 1 has higher optical performance while exhibiting the vibration reduction function as mentioned above. In other words, the present camera 1 can realize higher optical performance together with the vibration reduction function. Incidentally, even if a variable magnification optical system according to the second and the third Examples is installed as an imaging lens 2 in a camera, the same effect as the camera 1 can be obtained. Further, even if the variable magnification optical system according to each of the above Examples is installed in a camera, which does not include a quick return mirror 3, the same effect as the above described camera 1 can be obtained.

Lastly, an outline of a method for manufacturing the variable magnification optical systems according to the first and the second Embodiments of the present application is described with reference to FIGS. 14 and 15.

Figure 14:
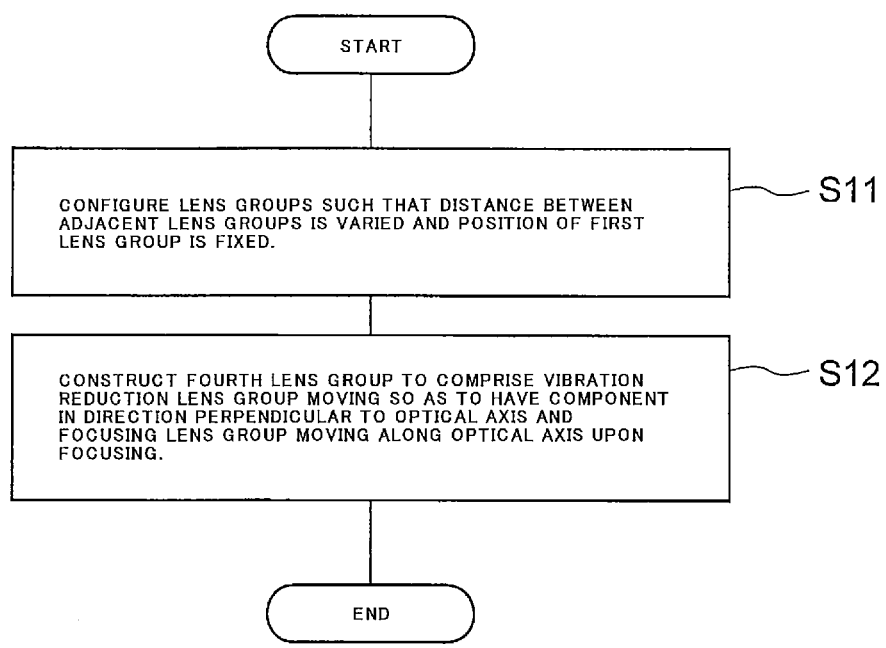
FIG. 14 is a flowchart schematically showing a method for manufacturing the variable magnification optical system according to the first Embodiment of the present application.

FIG. 14 is a flowchart schematically showing a method for manufacturing the variable magnification optical system according to the first Embodiment of the present application.

The method for manufacturing the variable magnification optical system according to the first Embodiment of the present application shown in FIG. 14 is a method for manufacturing a variable magnification optical system comprising, in order from an object side, a first lens group having positive refractive power, a second lens group having negative refractive power, a third lens group having positive refractive power, and a fourth lens group having positive refractive power, and the method comprises the following steps of S11 and S12:

Step S11: Preparing a first to a fourth lens groups and disposing the lens groups in a lens barrel in order from an object side, and then providing the lens barrel with a known movement mechanism to thereby configure the lens group such that, upon zooming, a distance between the adjacent lens groups is varied and the position of the first lens group is fixed.

Step S12: Providing the lens barrel with a known movement mechanism to thereby construct the fourth lens group so as to comprise a vibration reduction lens group which is moved so as to have a component in a direction perpendicular to the optical axis as well as a focusing lens group which is moved along the optical axis upon focusing.

Thus, the method for manufacturing a variable magnification optical system according to the first Embodiment of the present application makes it possible to manufacture a variable magnification optical system having higher optical performance while exhibiting the vibration reduction function.

Figure 15:
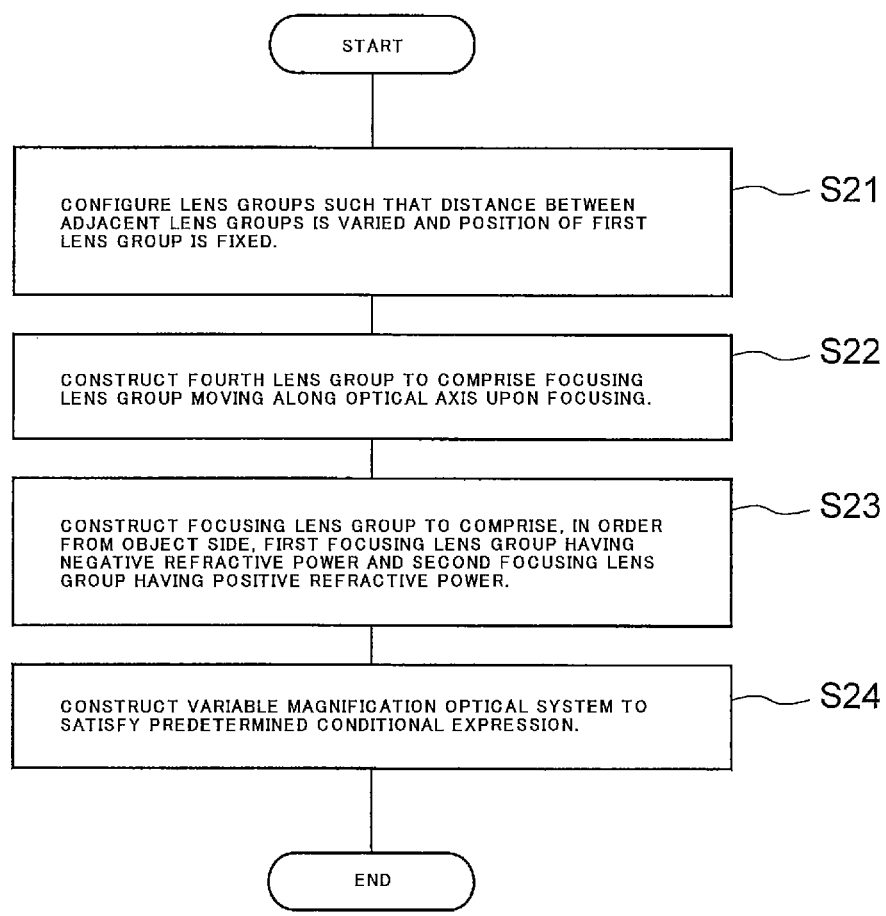
FIG. 15 is a flowchart schematically showing a method for manufacturing the variable magnification optical system according to the second Embodiment of the present application.

FIG. 15 is a flowchart schematically showing a method for manufacturing the variable magnification optical system according to the second Embodiment of the present application.

The method for manufacturing the variable magnification optical system according to the second Embodiment of the present invention shown in FIG. 15 is a method for manufacturing a variable magnification optical system comprising, in order from an object side, a first lens group having positive refractive power, a second lens group having negative refractive power, a third lens group having positive refractive power, and a fourth lens group having positive refractive power, and the method comprises the following steps of S21 to S24:

Step S21: Preparing a first to a fourth lens groups and disposing the lens groups in a lens barrel in order from an object side, and then providing the lens barrel with a known movement mechanism to thereby configure the lens group such that, upon zooming, a distance between the adjacent lens groups is varied and the position of the first lens group is fixed.

Step S22: Providing the lens barrel with a known movement mechanism to thereby construct the fourth lens group so as to comprise a focusing lens group which is moved along the optical axis upon focusing.

Step S23: Constructing the focusing lens group so as to comprise, in order from an object side, a first focusing group having negative refractive power and a second focusing group having positive refractive power.

Step S24: Constructing the variable magnification optical system so as to satisfy the following conditional expression (2-1):

$$0.10<fp/f4<0.45 \quad (2\text{-}1)$$

where fp denotes a focal length of the second focusing group; and f4 denotes a focal length of the fourth lens group.

Thus, the method for manufacturing a variable magnification optical system according to the second Embodiment of the present application makes it possible to manufacture a variable magnification optical system having higher optical performance.

What is claimed is:

1. A variable magnification optical system comprising, in order from an object side along an optical axis:
a first lens group having positive refractive power, and
an image side lens group disposed to an image side of the first lens group,
upon zooming, at least a distance between the first lens group and the image side lens group being varied, with the first lens group being fixed in position,
the image side lens group comprising a focusing lens group which is moved along the optical axis upon focusing,
the image side lens group comprising a vibration reduction lens group which is movable with a movement component in a direction perpendicular to the optical axis.

2. A variable magnification optical system comprising, in order from an object side along an optical axis:
a first lens group having positive refractive power, and
an image side lens group disposed to an image side of the first lens group,
upon zooming, at least a distance between the first lens group and the image side lens group being varied,
the image side lens group comprising a focusing lens group which is moved along the optical axis upon focusing,
the focusing lens group comprising, in order from the object side, a first focusing group and a second focusing group, and
the following conditional expression being satisfied:

$$0.10<|fp|/f4<0.45$$

where fp denotes a focal length of the second focusing group, and f4 denotes a focal length of the image side lens group.

3. The variable magnification optical system according to claim 1, wherein the focusing lens group comprises a first focusing group having negative refractive power and a second focusing group having positive refractive power, and
upon focusing, a distance between the first focusing group and the second focusing group is varied.

4. The variable magnification optical system according to claim 1, wherein the focusing lens group comprises a first focusing group and a second focusing group, and
upon focusing from an infinitely distant object to a close distant object, the first focusing group is moved away from the object side along the optical axis, and the second focusing group is moved toward the object side along the optical axis.

5. The variable magnification optical system according to claim 1, wherein the focusing lens group comprises a first focusing group having negative refractive power and a second focusing group, and
the following conditional expression is satisfied:

$$0.20<(-fn)/f4<0.60$$

where fn denotes a focal length of the first focusing group, and f4 denotes a focal length of the image side lens group.

6. The variable magnification optical system according to claim 1, wherein the following conditional expression is satisfied:

$$0.10<|fvr|/f4<0.80$$

where fvr denotes a focal length of the vibration reduction lens group, and f4 denotes a focal length of the image side lens group.

7. The variable magnification optical system according to claim 1, wherein the focusing lens group comprises a first focusing group and a second focusing group, and
the following conditional expression is satisfied:

$$0.12<D/D4<0.40$$

where D denotes a distance between the first focusing group and the second focusing group upon focusing on an infinitely distant object, and D4 denotes a length on the optical axis of the image side lens group.

8. The variable magnification optical system according to claim 1, wherein the image side lens group is a lens group disposed at the most image side, and
upon zooming, a distance between the lenses included in the image side lens group is not varied.

9. The variable magnification optical system according to claim 1, wherein the system comprises, in order from the object side, the first lens group, a second lens group having negative refractive power, a third lens group having positive refractive power, and the image side lens group.

10. An optical apparatus equipped with the variable magnification optical system according to claim 1.

11. The variable magnification optical system according to claim 1, wherein a shooting magnification in any focal length state is equal to or exceeds −0.5.

12. The variable magnification optical system according to claim 2, wherein, upon zooming, the first lens group is fixed in position.

13. The variable magnification optical system according to claim 2, wherein the first focusing group has negative refractive power and the second focusing group has positive refractive power, and
upon focusing, a distance between the first focusing group and the second focusing group is varied.

14. The variable magnification optical system according to claim 2, wherein upon focusing from an infinitely distant object to a close distant object, the first focusing group is moved away from the object side along the optical axis, and the second focusing group is moved toward the object side along the optical axis.

15. The variable magnification optical system according to claim 2, wherein the first focusing group has negative refractive power, and
the following conditional expression is satisfied:

$$0.20<(-fn)/f4<0.60$$

where fn denotes a focal length of the first focusing group, and f4 denotes a focal length of the image side lens group.

16. The variable magnification optical system according to claim 2, wherein the image side lens group comprises a vibration reduction lens group which is movable with a movement component in a direction perpendicular to the optical axis.

17. The variable magnification optical system according to claim 2, wherein the image side lens group comprises a vibration reduction lens group which is movable with a movement component in a direction perpendicular to the optical axis, and
the following conditional expression is satisfied:

$$0.10<|fvr|/f4<0.80$$

where fvr denotes a focal length of the vibration reduction lens group, and f4 denotes a focal length of the image side lens group.

18. The variable magnification optical system according to claim 2, wherein the following conditional expression is satisfied:

$$0.12<D/D4<0.40$$

where D denotes a distance between the first focusing group and the second focusing group upon focusing on an infinitely distant object, and D4 denotes a length on the optical axis of the image side lens group.

19. The variable magnification optical system according to claim 2, wherein the image side lens group is a lens group disposed at the most image side, and upon zooming, a distance between the lenses included in the image side lens group is not varied.

20. The variable magnification optical system according to claim 2, wherein the system comprises, in order from an object side, the first lens group, a second lens group having negative refractive power, a third lens group having positive refractive power, and the image side lens group.

21. An optical apparatus equipped with the variable magnification optical system according to claim 2.

22. The variable magnification optical system according to claim 2, wherein a shooting magnification in any focal length state is equal to or exceeds −0.5.

23. A method for manufacturing a variable magnification optical system comprising, in order from an object side along an optical axis, a first lens group having positive refractive power and an image side lens group disposed to an image side of the first lens group, the method comprising one or more of the following features (A), (B) and (C):

(A) constructing such that, upon zooming, at least a distance between the first lens group and the image side lens group is varied, with the first lens group being fixed in position, and
constructing the image side lens group to comprise a focusing lens group which is moved along the optical axis upon focusing, and a vibration reduction lens group which is movable with a movement component in a direction perpendicular to the optical axis;

(B) constructing such that, upon zooming, at least a distance between the first lens group and the image side lens group is varied,
constructing the image side lens group comprise a focusing lens group which is moved along the optical axis upon focusing,
constructing the image side lens group to comprise a vibration reduction lens group which is movable with a movement component in a direction perpendicular to the optical axis, and
satisfying the following conditional expression:

$$0.10<|fvr|/f4<0.80$$

where fvr denotes a focal length of the vibration reduction lens group and f4 denotes a focal length of the image side lens group;

(C) constructing such that, upon zooming, at least a distance between the first lens group and the image side lens group is varied,
constructing the image side lens group to comprise a focusing lens group which is moved along the optical axis upon focusing,
constructing the focusing lens group to comprise, in order from the object side, a first focusing group and a second focusing group, and
satisfying the following conditional expression:

$$0.10<|fp|/f4<0.45$$

where fp denotes a focal length of the second focusing group and f4 denotes a focal length of the image side lens group.

24. A variable magnification optical system comprising, in order from an object side along an optical axis:
a first lens group having positive refractive power, and
an image side lens group disposed to an image side of the first lens group,
upon zooming, at least a distance between the first lens group and the image side lens group being varied,
the image side lens group comprising a focusing lens group which is moved along the optical axis upon focusing,
the image side lens group comprising a vibration reduction lens group which is movable with a movement component in a direction perpendicular to the optical axis,
wherein the following conditional expression is satisfied:

$$0.10<|fvr|/f4<0.80$$

where fvr denotes a focal length of the vibration reduction lens group, and f4 denotes a focal length of the image side lens group.

* * * * *